(12) United States Patent
Spear et al.

(10) Patent No.: US 6,853,621 B1
(45) Date of Patent: Feb. 8, 2005

(54) SYSTEM AND METHOD FOR SELECTING A PACKET-SWITCHED TELEPHONY SERVICE PROVIDER

(75) Inventors: Laurance A. Spear, Chicago, IL (US); John A. Nix, Chicago, IL (US)

(73) Assignee: Go2Call.com, Inc., Evanston, IL (US)

( * ) Notice: Subject to any disclaimer, the term of this patent is extended or adjusted under 35 U.S.C. 154(b) by 0 days.

(21) Appl. No.: 09/487,410

(22) Filed: Jan. 18, 2000

(51) Int. Cl.[7] .......................... H04L 12/26; G06F 9/44; G06F 13/00
(52) U.S. Cl. ...................... 370/238; 370/351; 370/352; 709/314; 709/315; 709/316; 709/317
(58) Field of Search ................................ 370/238, 235, 370/352, 389, 392, 394, 229, 351, 464–465; 709/313–317

(56) References Cited

U.S. PATENT DOCUMENTS

| | | | | | |
|---|---|---|---|---|---|
| 6,081,508 | A | * | 6/2000 | West et al. ................. | 370/238 |
| 6,227,743 | B1 | * | 5/2001 | Robb .......................... | 401/243 |
| 6,275,574 | B1 | * | 8/2001 | Oran .......................... | 379/201 |
| 6,381,314 | B1 | * | 4/2002 | Walinski ................. | 379/101.01 |
| 6,480,594 | B1 | * | 11/2002 | Van Tol ................. | 379/221.02 |
| 6,598,056 | B1 | * | 7/2003 | Hull et al. ............... | 707/104.1 |
| 6,631,357 | B1 | * | 10/2003 | Perkowski ................... | 705/26 |
| 6,633,914 | B1 | * | 10/2003 | Bayeh et al. ............... | 709/227 |
| 6,654,808 | B1 | * | 11/2003 | Chuah ........................ | 709/227 |

* cited by examiner

Primary Examiner—Seema S. Rao
Assistant Examiner—Ronald Abelson
(74) Attorney, Agent, or Firm—McDonnell Boehnen Hulbert & Berghoff LLP

(57) ABSTRACT

A system and method for identifying location-specific information. The system and method may preferably be used to identify available packet-switched telephony service providers, such as internet telephony service providers, providing telephony service to a desired call destination. In a preferred embodiment, a user enters one or more call criteria, such as a telephone number or a location description, which are transmitted across a packet-switched network to a server. The server determines location-specific information corresponding to the one or more call criteria. For example, the server may determine a location corresponding to the one or more call criteria, and may further use the determined location to identify available packet-switched telephony service providers offering telephony service to the determined location. A least costly packet-switched telephony service provider may be used by the server to place a call from the user to an entered telephone number. Alternative, a listing of available telephony service providers may be transmitted by the server across the packet-switched network to the user located at a user device. The user may then initiate a call by selecting one of the available packet-switched telephony service providers.

1 Claim, 24 Drawing Sheets

Microfiche Appendix Included
(3 Microfiche, 148 Pages)

Available Service Providers for calling to Japan

International Long Distance Rates
(regular phone calls from the US)

| Service Provider | Rate($) |
|---|---|
| Circuit-switched Provider A | $0.16/minute |

―1702

1704

PC-To-Phone Options

| | Call Provider | Calling Rate ($) | Monthly Fee ($) | Initial Prepay Amount ($) | Software Download Required | Call Origin Restrictions | Call Time Restrictions | Full Details |
|---|---|---|---|---|---|---|---|---|
| 1722 | Competitor A | $0.09 /minute | $0.00 | $20.00 | Yes | No | No | (go) |
| 1724 | Competitor B | $0.11 /minute | $0.00 | $25.00 | Yes | No | No | (go) |
| 1726 | Competitor C | $0.15 /minute | $0.00 | $25.00 | Yes | No | No | (go) |

Available Service Providers for calling 0086255566 in Nanjing in China

International Long Distance Rates (regular phone calls from the US)

| Call Provider | Rates($) |
|---|---|
| Circuit-switched Provider A | $0.42/minute |

PC-To-Phone Options

| Compare Up to 3 | Call Provider | Calling Rate ($) | Monthly Fee ($) | Initial Prepay Amount ($) | Software Download Required | Call Origin Restrictions | Call Time Restrictions | Full Details |
|---|---|---|---|---|---|---|---|---|
| ☐ | Competitor A | $0.30/minute | $0.00 | $10.00 | Yes | No | No | go |
| ☐ | Competitor B | $0.33/minute | $0.00 | $20.00 | Yes | No | No | go |
| ☐ | Competitor C | $0.35/minute | $0.00 | $25.00 | Yes | No | No | go |
| ☐ | Competitor D | $0.36/minute | $0.00 | $25.00 | Yes | No | No | go |
| ☐ | Competitor E | $0.39/minute | $0.00 | n/a | n/a | No | No | go |

Compare Details    Clear

FIG. 22

Available Service Providers for calling 008625555666 in Nanjing in China

International Long Distance Rates (regular phone calls from the US)

| Call Provider | Rates($) |
|---|---|
| Circuit-switched Provider A | $0.42/minute |

PC-To-Phone Options

| Compare Up to 3 | Call Provider | Calling Rate ($) | Monthly Fee ($) | Initial Prepay Amount ($) | Software Download Required | Call Origin Restrictions | Call Time Restrictions | Full Details |
|---|---|---|---|---|---|---|---|---|
| ☑ | Competitor A | $0.30 /minute | $0.00 | $10.00 | Yes | No | No | go |
| ☑ | Competitor B | $0.33 /minute | $0.00 | $20.00 | Yes | No | No | go |
| ☑ | Competitor C | $0.36 /minute | $0.00 | $25.00 | Yes | No | No | go |
| ☐ | Competitor D | $0.36 /minute | $0.00 | $25.00 | Yes | No | No | go |
| ☐ | Competitor E | $0.39 /minute | $0.00 | n/a | n/a | No | No | go |

[ Compare Details ] [ Clear ]

FIG. 23

Side-by-Side Comparison

| Descriptions | Competitor A | Competitor B | Competitor C |
|---|---|---|---|
| PC to Phone Rate | $0.30/minute | $0.33/minute | $0.36/minute |
| PC to Phone Monthly Fee | $0.00 | $0.00 | $0.00 |
| Minimum Prepaid Amount | $10.00 | $20.00 | $25.00 |
| Maximum Prepaid Amount | n/a | $100.00 | n/a |
| Cancellation Fee | n/a | n/a | n/a |
| Cancellation Terms | n/a | n/a | n/a |
| PC Software-Option #1 | Biztrans dialer | Vocaltec Iphone | Phone dialer |
| Call Origin Restrictions | n/a | n/a | n/a |
| Call Time Restrictions | n/a | n/a | n/a |
| Comments About Service Provider | Chinese language site available | Focused on US and China market | Also offers calling cards as well as fax, voice mail and email in a single inbox |
| Comments About Rate | n/a | n/a | n/a |

FIG. 24

SYSTEM AND METHOD FOR SELECTING A PACKET-SWITCHED TELEPHONY SERVICE PROVIDER

MICROFICHE APPENDIX

This document contains a microfiche appendix, which consists of three (3) sheets of microfiche and a total of one hundred forty-eight (148) frames.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

The present invention relates to telephony services. More particularly, the present invention relates to identifying one or more packet-switched telephony service providers based on one or more call criteria.

BACKGROUND OF THE INVENTION

Internet usage has been increasing at a staggering rate. In June, 1998, Matrix Information and Directory Services (MIDS) reported that 102 million people around the world were accessing the Internet. That compares to MIDS' estimate of 57 million in January, 1997, and an estimate of 707 million worldwide Internet users by 2001. Many of these Internet users are World-Wide Web surfers who use the Web to obtain information, watch video clips, or make on-line purchases, for example. Another primary use of the Internet is for electronic mail (e-mail). E-mail provides a convenient medium for exchanging primarily textual communications.

More recently, the Internet has been used for voice communication. Internet telephony is one example of packet-switched telephony. In packet-switched telephony, a packet-switched network, such as the Internet, serves as a transportation medium for packets carrying voice data. Voice-over-Internet-Protocol (VOIP) is one example of a collection of standards and protocols used to support voice communications over packet-switched networks such as the Internet. Others have been developed as well. A common Internet telephony scheme involves a computer or other device that is capable of connecting to the Internet. A gateway from the Internet to the Public-Switched Telephone Network (PSTN) allows a user of the computer to communicate through the Internet and PSTN to a telephone subscriber at a telephone connected to the PSTN. Other configurations are also possible.

Numerous benefits may be realized through the use of packet-switched telephony. For example, calls may be less expensive because of the utilization of a packet-switched network, such as the Internet, to traverse distances around the world. This is in contrast to conventional telephone service, which typically involves tying up telephone circuits to connect calls. Thus, a user in one location may communicate with a telephone subscriber at a second location by transmitting voice data across the Internet to a gateway that is located near a telephone subscriber's location, in order to avoid paying long distance fees that might otherwise be associated with making such a call. Another possible advantage of packet-switched telephony service is the convenient interfaces and features that may be offered in a packet-switched telephony system. For example, volume control, a video session, or an address book application may be implemented. Many Internet Telephony Service Providers (ITSPs) have been formed in order to provide these services. Examples of ITSPs include Net2Phone, DialPad, Maxcall, AccessPower, and others. Each ITSP generally has its own calling rate and fee structure and may require a download of proprietary software. Additionally, there may be restrictions on the types of calls placed, such as restrictions on call origin or destination, or on the time of day the call is placed.

A user is therefore presented with a choice as to which ITSP to select for making an Internet telephony call. (A similar choice would likely be presented in any packet-switched telephony system). If a user wishes to minimize costs, he or she may select an ITSP that costs the least amount of money per unit time for the anticipated call duration. This typically requires the user to access service attributes for each of the ITSPs in order to determine which of them is the least costly. For example, a user may access one or more ITSP web sites to determine the calling rate to a desired call destination for a desired call duration. Such a process can be cumbersome and time-consuming. Similarly, the user may wish to use the ITSP that offers the best Quality of Service (QoS) for a given Internet telephony call. Here again, the user would likely be required to obtain information, such as Service Level Agreement (SLA) information, pertaining to one or more ITSPs. This would again involve spending time searching for, as well as possibly recording, the respective service attributes for each of the queried ITSPs, in order to preserve the findings for future reference. If service attributes change, recorded attributes may be inaccurate.

There is, therefore, a need for an efficient system and method for identifying available packet-switched telephony service providers, such as an ITSPs. Such a means should be efficient and easy to use, and should provide information on service providers to enable a user to make a decision as to which service provider to use for a call.

It would also be desirable for a system for identifying available packet-switched telephony service providers to be implemented on a packet-switched network, such as the Internet.

Another desirable feature would be for a computer or other user device to display an address book interface through which a user could select an address book entry corresponding to a telephone subscriber, thereby initiating a procedure in which service attributes for a number of packet-switched telephony service providers are obtained and presented to the user, preferably ranked according to a ranking scheme. A further desirable feature would be for a server-based system, such as a website, to provide an on-line address book application, through which users could store contact information as one or more address book entries and obtain service provider information for calls placed to selected contact entries.

It would also be desirable for a user to be able to enter a telephone number or location description into a query field to obtain a listing of packet-switched telephony service providers providing service to the entered phone number or location description.

It would also be desirable for such a system to initiate a call through a highest-ranked packet-switched telephony service provider according to a ranking scheme.

An additional useful feature would be for the user to have the ability to identify businesses or other location-specific information located near a specified location or telephone number. It would also be desirable to provide a system through which a user could enter a telephone number in an on-line form, such as a webpage form, after which information associated with the location corresponding to the telephone number would be provided.

SUMMARY OF THE INVENTION

In accordance with an illustrative embodiment of the present invention, some of the problems associated with on-line selling systems are addressed.

In a first embodiment, a system for selecting a packet-switched telephony service provider is provided. This system includes a user device and a server, each linked to a packet-switched network. The user device is operable to accept a call criterion from a user, which the user device may transmit to the server via the packet-switched network. The server is operable to accept the call criterion via the packet-switched network, and to determine available packet-switched telephony service providers corresponding to the call criterion. The server then may transmit a listing of packet-switched telephony service providers across the packet-switched network to the user of the user device. The call criterion is preferably a telephone number, a portion of a telephone number, a location description, or other attribute. The system may further be used to initiate a call using a selected packet-switched telephony service provider. The system preferably operates on the Internet through a system of web pages located on the server and accessed by the user at the user device through the packet-switched network. Available packet-switched telephony service providers may be determined by parsing the call criterion into sub-parts, which may be converted into a location description using database queries.

In another embodiment, a server for presenting available packet-switched telephony service providers is provided. The server includes a network interface linking the server to a packet-switched network, a database of packet-switched telephony service providers, a database of telephone codes, a memory, and a processor. The processor executes a user access application and a database application (which may be the same application), to enable the processor to determine a location corresponding to a telephone number entered by a user at a user device, and transmitted across the packet-switched network to the server. The location description may then be used to determine location-specific information, such as available packet-switched telephony service providers.

In yet another embodiment, a server is provided to enable a user to identify location-specific information corresponding to an entered telephone number. The server includes a used access module, application scripts, a database processor for accessing and maintaining one or more databases, and a telephone number request handler for parsing an entered telephone number using one or more telephone number parsing tables.

In still yet another embodiment, a user device for discovering available packet-switched telephony service providers is provided. The user device includes a user interface having an audio input module, an audio output module, and a visual output module, a processor, a memory, and a network interface. The processor runs an operating system and executes a service provider selection application operable to accept a telephone number through the interface from the user. The network interface is operable to transmit the telephone number to a service provider selection server and to receive a listing of available packet-switched telephony service providers from the service provider selection server. A packet-switched network to which the user device is connected is preferably the Internet, and the user device includes a web browser for displaying web pages, accessed via the packet-switched network from the service provider selection server.

In another embodiment, a method for identifying available packet-switched telephony service providers is provided. The method includes accepting a call criterion at a server, determining available packet-switched telephony service providers corresponding to the call criterion, and transmitting the listing of available packet-switched telephony service providers across the packet-switched network to the user at the user device. The call criterion is preferably a telephone number, but also may be a geographic description, a mail code, a price specification, or some other specification or attribute. The step of determining available packet-switched telephony service providers may include determining a geographic location corresponding to the call criterion and accessing a packet-switched telephony service provider database to determined packet-switched telephony service providers offering telephony service to the geographic location. The listing of available packet-switched telephony service providers may be ranked according to a ranking scheme. In an alternative embodiment, the call criterion may be specified by a user selecting an address book entry in an address book application located at the user device or on the server. In yet another embodiment of the present invention, a method for selecting a service provider for a packet-switched telephony call is provided. A geographic location is determined, corresponding to a call criterion accepted from a user. Service attributes corresponding to packet-switched telephony service providers offering service to the geographic location are determined, and a ranked listing of the available packet-switched telephony service providers is transmitted across a packet-switched network to a user at a user device. The server may then accept a service provider selection from the user, where the service provider selection indicates a preferred service provider. The server may then initiate a call using the preferred service provider, or the server may forward the user to a web site operated by the preferred service provider.

In still yet another embodiment, a method for presenting available packet-switched telephony service providers is provided. The method includes determining a geographic location corresponding to a telephone number and accessing a packet-switched telephony service provider database to determine packet-switched telephony service providers offering telephony service to the geographic location. The step of determining a geographic location corresponding to the telephone number may include parsing the telephone number into an international country code, a city code, and a local exchange code, and then accessing a telephone code database to determine the geographic location. In a further embodiment, a call may be initiated to the telephone number using a least costly telephony service provider.

In another embodiment of the present invention, a method for determining available packet-switched telephony service providers is provided. The method includes accepting a call criterion from a user, transmitting the call criterion across the packet-switched network to a server, receiving the listing of available packet-switched telephony service providers from the server, and displaying the listing of available packet-switched telephony service providers to the user. The method may further include accepting a service provider selection from the user and transmitting the service provider selection to the server across the packet-switched network. The step of accepting a call criterion from a user may include displaying an address book interface to the user and accepting an address book entry selection from the user, where the address book entry selection includes the call criterion.

In yet another embodiment of the present invention, a method for identifying location-specific information is provided. A server receives a telephone number across a packet-switched network from a user. The telephone number is parsed into one or more telephone codes, which may include an international country code, a city or area code, and a local exchange code. The parsed telephone number is used to determine a geographic location. The geographic location is used to conduct a database search for location-specific information.

BRIEF DESCRIPTION OF THE DRAWINGS

Preferred embodiments of the present invention are described with reference to the following drawings, wherein:

FIG. 17 is a pictorial diagram illustrating a list of available packet-switched telephony service providers, according to an exemplary embodiment of the present invention;

FIG. 22 is a pictorial diagram illustrating a web page for displaying a listing of available telephony service providers, according to a preferred embodiment of the present invention;

FIG. 23 is a pictorial diagram illustrating a web page showing available service providers, according to an exemplary embodiment of the present invention;

FIG. 24 is a pictorial diagram illustrating a web page for comparing available packet-switched telephony service providers, according to a preferred embodiment of the present invention.

DETAILED DESCRIPTION OF THE PRESENTLY PREFERRED EMBODIMENTS

I. Packet-Switched Telephony

Figure 1:
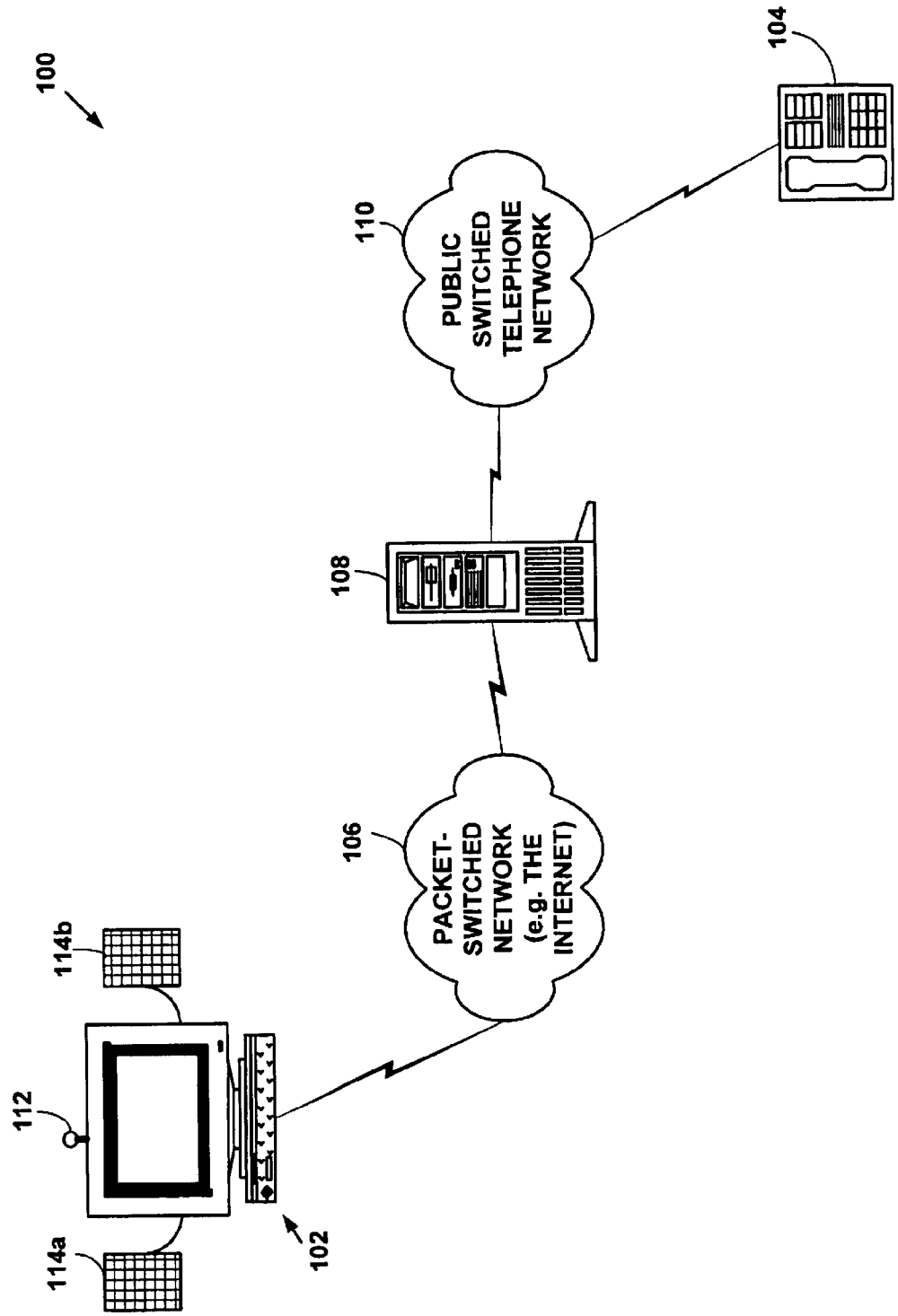
FIG. 1 is a simplified block diagram illustrating an exemplary packet-switched telephony system.

FIG. 1 is a simplified block diagram illustrating an exemplary packet-switched telephony system 100. The system 100 includes a computer 102 from which a user wishes to place a call to a telephone subscriber located at a phone 104. The computer 102 is linked to a packet-switched network 106, such as the Internet. An Internet Telephony Service Provider (ITSP) or other packet-switched telephony service provider may operate a telephony gateway 108 between the packet-switched network 106 and a Public-Switched Telephone Network (PSTN) 110. The PSTN 110 provides service to the phone 104. The packet-switched network 106 includes network equipment that routes the individual voice data packets to a destination address identified in the individual packets.

The computer 102 contains a microphone 112 and speakers 114a,b. During a call, a user located at the computer 102 can speak into the microphone 112 to provide a voice signal input to the computer 102. A processor in the computer 102 digitizes the user's voice and assembles the data into packets according to one or more protocols, such as the Internet Protocol (IP) suite. These voice data packets are then transmitted across the packet-switched network 106 to the gateway 108. The sampling rate of the voice signal is preferably chosen to be high enough to cause the digitized voice data to sound like a continuous voice signal to a human ear. The gateway 108 converts the voice data packets back into a voice signal for further transmission on the PSTN 110. The PSTN 110 transmits the voice signals on a dedicated circuit to the phone 104. A user located at the phone 104 receives the voice signals, which may be heard through a speaker associated with the phone 104. Similarly, the user located at the phone 104 can speak into a microphone at the phone 104 to cause a voice signal to be transmitted across the PSTN 110 to the gateway 108, where the voice signal is converted into voice data packets for transmission across the packet-switched network 106 to the computer 102. The processor in the computer 102 may convert the voice data packets into a voice signal to be played on the speakers 114*a,b*.

Although the gateway 108 is shown as being a single device in FIG. 1, an ITSP may have several or many gateways similar to the gateway 108. The different gateways would likely be located in various locations around the world to take advantage of possible savings in long distance fees. Although the PSTN 110 may offer circuit-switched telephone service to local phone subscribers as well as to subscribers located at more distant local exchanges, long distance fees might be incurred for placing calls through the distant local exchanges. Thus, an ITSP will preferably route the call to a gateway having a connection to a PSTN that can provide local service to the phone number to be called. An ITSP gateway may be used to administer such a call routing scheme for a particular ITSP.

Figure 2:
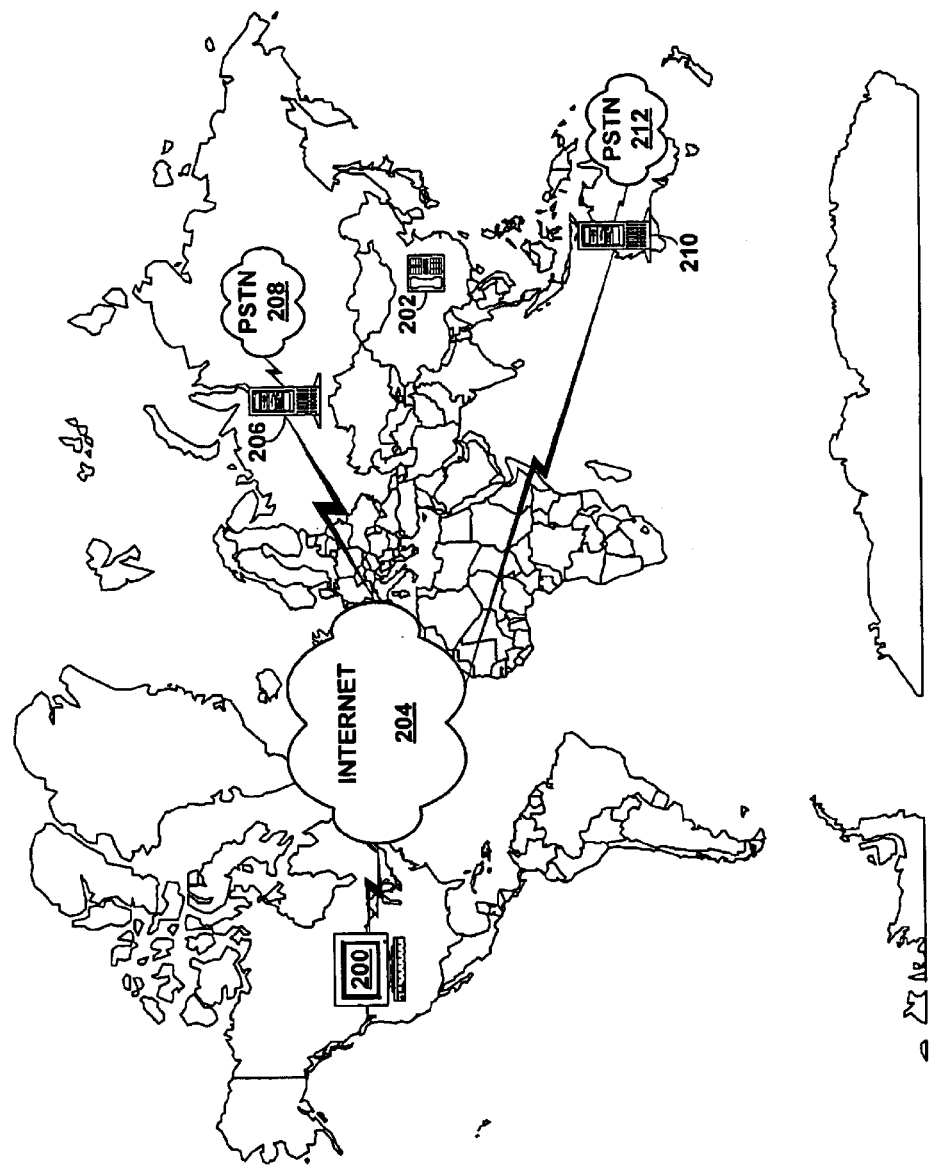
FIG. 2 is a pictorial and block diagram illustrating an exemplary ITSP selection process.

FIG. 2 is a pictorial and block diagram illustrating an example of an ITSP selection process that might be undertaken by a user located at a user device 200 when deciding how to make a call to a telephone subscriber located at a telephone subscriber device 202. The user device 200 has a connection to the Internet 204. A first competing ITSP, CompetitorA ITSP, operates a CompetitorA gateway located near a first PSTN 208. A second competing ITSP, CompetitorB ITSP, operates a CompetitorB gateway located near a second PSTN 212. For this example, the user device 200 is located in the United States, the Internet is a global Internet, the CompetitorA gateway 206 and the first PSTN 208 are located in Russia, the CompetitorB gateway 210 and the second PSTN 212 are located in Australia, and the telephone subscriber device 202 is located in China.

If the user desires to minimize costs for a call placed from the user device 200 to the prospective party-to-be-called device 202, the user may contact the competing ITSPs to determine service attributes, such as price per minute for making the call to China. This information-gathering process may involve looking at hard-copy literature, accessing Web sites corresponding to the respective competing ITSPs, or other methods. Since in the illustrated example there are no ITSP gateways shown in China, the competing ITSPs' costs for providing service for the call may include costs attributable to long distance fees. (If the telephone subscriber was located in Australia, then it is possible that there would be no long distance fees associated with the competitorB ITSP providing the call service, for example.)

For the CompetitorA ITSP to provide service for the call to China, the user would use the user device 200 to access the Internet 204 to reach the CompetitorA gateway 206. The CompetitorA gateway 206 would cause the phone number corresponding to the telephone subscriber device 202 to be dialed via the first PSTN 208. The first PSTN 208 would attempt to set up a dedicated circuit to the telephone subscriber device through various exchanges. When the telephone subscriber answers the call, transmission of voice data may begin. In contrast, if the user chose to utilize the CompetitorB ITSP, then the user would use the user device 200 to access the Internet 204 to place a call using the CompetitorB gateway 210. The CompetitorB gateway 210 would cause the second PSTN 212 to attempt to obtain a circuit to the telephone subscriber device in China through various exchanges. Thus, the user has two choices for making the call to the telephone subscriber and the selected choice is likely to depend on such factors as the location of the gateways owned by the competing ITSPs, CompetitorA ITSP and CompetitorB ITSP.

II. System for Selecting a Packet-Switched Telephony Service Provider

Figure 3:
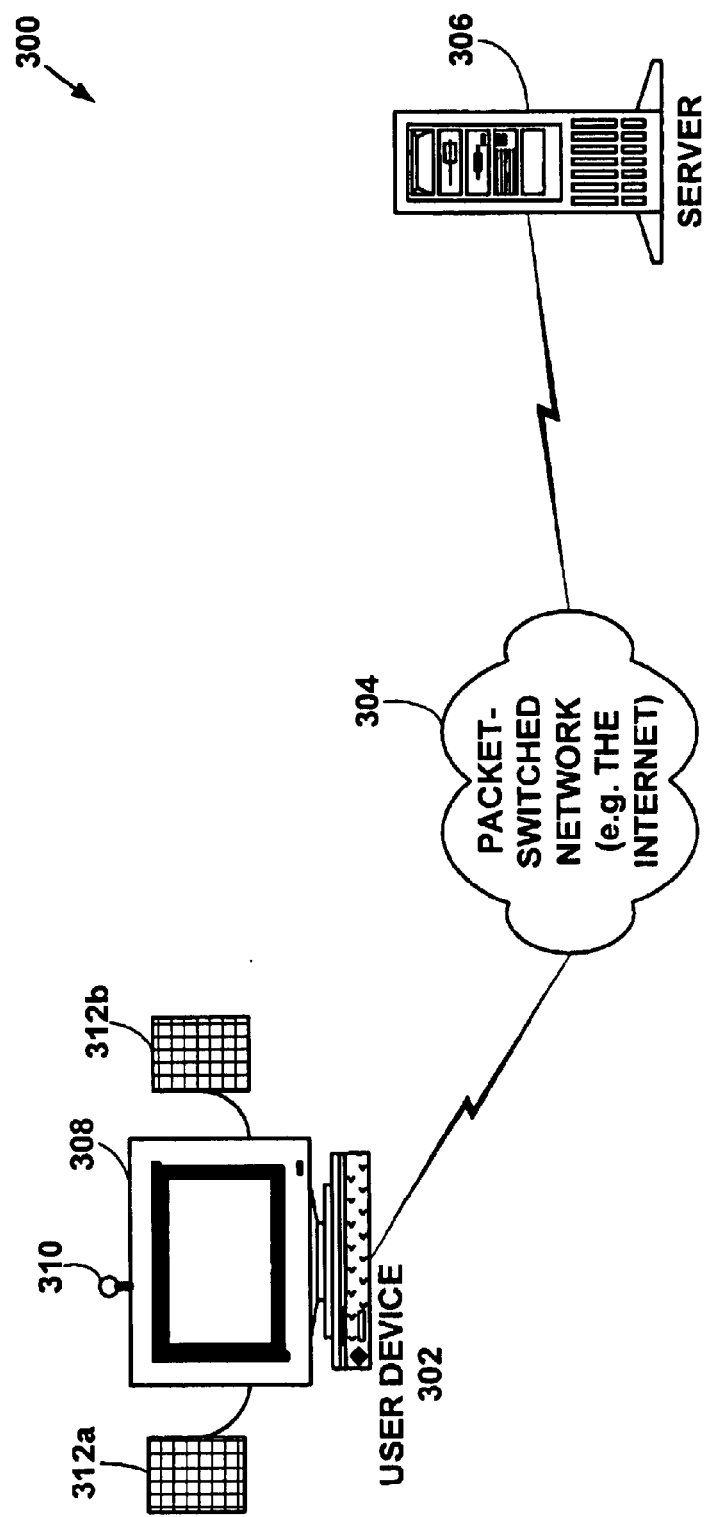
FIG. 3 is a simplified block diagram illustrating a system for selecting a packet-switched telephony service provider, according to an embodiment of the present invention.

FIG. 3 is a simplified block diagram illustrating a system 300 for selecting a packet-switched telephony service provider, according to an embodiment of the present invention. The system 300 includes a user device 302 linked to a packet-switched network 304. A server 306 is also linked to the packet-switched network 304. Through the use of networking protocols, the user device 302 is able to access the server 306 through the packet-switched network 304.

The server 306 includes a processor executing one or more applications to enable users to select a packet-switched telephony service provider. The applications are preferably in the form of an Internet Web site that may be accessed by a user at the user device 302 through the packet-switched network 304. Accordingly, when the user enters a call criterion, such as a phone number or a country at which the destination phone number is located, the server 306 will determine available packet-switched telephony providers corresponding to the call criterion entered by the user at the user device 302. For example, if the user enters the country name, Germany, the server 306 determines packet-switched telephony service providers offering packet-switched telephony service to Germany. A listing of available packet-switched telephony service providers is then displayed to the user, preferably on the Web site located on the server 306, accessed through the packet-switched network 304, and displayed on the user device 302.

In a preferred embodiment, the listing of available packet-switched telephony service providers is ranked according to a ranking scheme. The ranking scheme may be a default ranking scheme or it may be specified by the user, for example. Items to be ranked may receive the rank, (e.g. two service providers charge the same price per minute to a selected destination). In such a case, the items with the same rank may be ordered randomly or according to a predefined procedure (default or user-specified).

In a further embodiment, the user may select one of the packet-switched telephony service providers listed in the listing of available packet-switched telephony service providers by selecting a graphical selection mechanism, such as a clickable screen button displayed on the user device 302. This selection may then be transmitted across the packet-switched network 304 to the server 306. The selection may be used to initiate a packet-switched telephony call, if desired. For example, the selection may cause the server 306 to forward the user to a website corresponding to the selected packet-switched telephony provider. In such a case, the user device 302 would preferably display a webpage to enable the user to place a packet-switched telephony call across the packet-switched network through the packet-switched telephony service provider website and its respective gateway(s) to a PSTN and finally to the device at which the telephone subscriber is located. Alternatively, the selection of the user may be used by the server 306 to directly place the call using service provided by the selected packet-switched telephony service provider. This alternative may be facilitated through the use of a contractual arrangement between the administrator of the server 306 and the selected packet-switched telephony service provider.

In another alternative embodiment, the server 306 includes an application having a sorting algorithm to identify a least costly packet-switched telephony service provider to be used to place a call. When the user enters a call criterion, such as a telephone number, the server uses the call criterion to determine available packet-switched telephony service providers. Instead of transmitting a listing of the available packet-switched telephony service providers, the server initiates a call from the user located at the user device to the entered number using the least costly service provider. This alternative may be facilitated through the use of a contractual arrangement between the administrative of the server 306 and the selected packet-switched telephony service provider. Alternatively, the call may be initiated by using the call criterion (along with other default or pre-specified call parameters required by the identified service provider) to initiate the call. For example, the user may access an address book application on a web site located on the server. By clicking on the name a contact to call, the server will identify the least costly service provider and initiate the call from the user to the telephone subscriber selected.

Although the user device 302 is shown as a computer, other implementations are also possible and are intended to be within the scope of the present invention. For example, a portable phone having Web access or other data network access may be used to select a packet-switched telephony service provider according to the present invention. The user device 302 of FIG. 3 is shown as a computer having a monitor 308, a microphone 310, and speakers 312a,b. Embodiments of the user device 302 will be described in further detail with respect to FIGS. 4 and 5.

The packet-switched network 304 may be any network or collection of networks through which data units, such as packets, cells, or frames, may be communicated. The packet-switched network 304 may include portions that consist of physical wires, as well as portions that are wireless. In the preferred embodiment, the packet-switched network 304 is the Internet and the Internet Protocol (IP) protocol stack is utilized for communicating data across the packet-switched network 304.

The server, 306, is preferably a web server on the Internet, with access to one or more databases. Embodiments of the server 306 will be described in further detail with reference to FIGS. 6 and 7.

A. User Device

Figure 4:
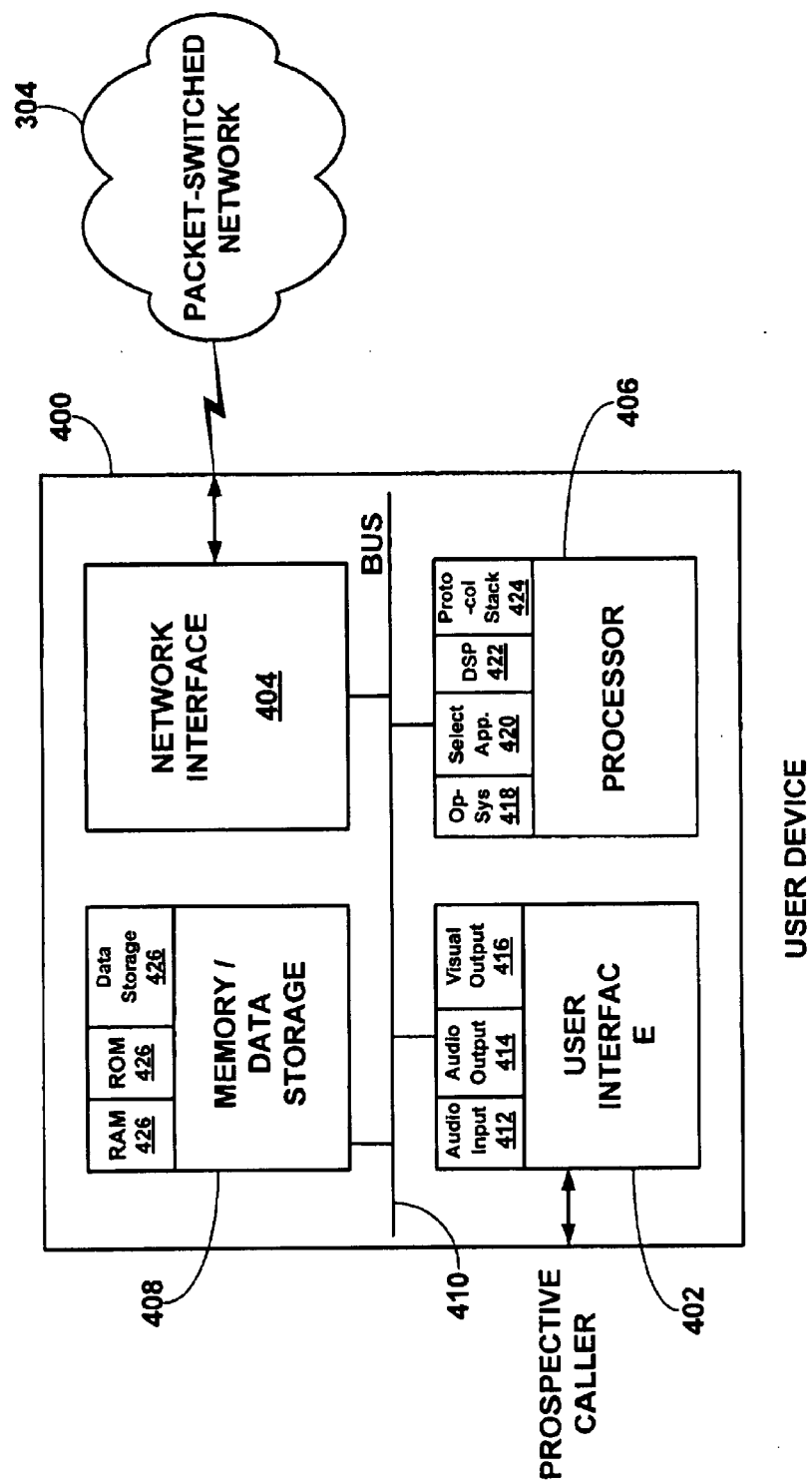
FIG. 4 is a simplified block diagram illustrating a user device according to one embodiment of the present invention.

FIG. 4 is a simplified block diagram illustrating a user device according to one embodiment of the present invention. The user device 400 includes a user interface 402, a network interface 404, a processor 406, and a memory/data storage unit 408. A bus 410 is shown interconnecting the user interface 402, the network interface 404, the processor 406, and the memory/data storage unit 408. Other connection schemes besides the scheme shown may alternatively be utilized.

The user interface 402 provides output to and receives input from the user. The user interface 402 preferably includes modules for audio input 412, audio output 414, and visual output 416. The audio input module 412 may include a microphone, for example. The audio output 414 preferably is a speaker or set of speakers. The audio input module 412 and the audio output module 414 may be combined into a headset, in which headphone speakers are connected to a microphone placed in close proximity to the user's voice. The visual output module 416 is preferably a display screen, such as a computer monitor or integral LCD display, that is capable of displaying graphical information, including text. The visual output module 416 may also be implemented in a text-only version. In the preferred embodiment, a web browser displays web pages, including on-line forms through which the user may enter information, such as call criteria (phone numbers, countries, price limits, etc.) and service provider selections, for example. Web browsers are well known, and further information may be found by referencing the web sites for Netscape and Microsoft.

The network interface 404 enables the user device 400 to transmit output to and receive input from devices on the packet-switched network 304. The network interface 404 may include a data transceiver device, such as an analog modem, a cable modem, or an DSL (Digital Subscriber Line) transceiver, for example. In such cases, the packet-switched network 304 may include a network service provider, such as an Internet service provider (ISP), through which the user device 400 would link to the packet-switched network 304. If the user device 400 is a portable phone, then the network interface 404 may include an antenna and the packet-switched network 304 would include a wireless gateway to the packet-switched network.

The processor 406 preferably runs an operating system 418, such as Microsoft Windows 98, Windows 2000, Windows NT, or another commercially available or proprietary operating system. The processor 406 may also execute one or more applications, such as a packet-switched telephony service provider application 420. Other additional or alternative applications may include a web browser, or a packet-switched telephony application. The packet-switched telephony application may be an Internet telephony application, for example, in which the user may call another party via the Internet. The processor may also include DSP (digital signal processing) functionality 422 for converting voice signals received at the audio input 412 into digital voice data and for converting digital voice data received across the packet-switched network 304 through the network interface 404 into analog voice signals to be played through audio output 414. A network protocol stack 424 may also be implemented within the processor 406 or the network interface 404 to allow network communications across the packet-switched network 304. An exemplary network protocol stack is the TCP/IP protocol stack described in W. Richards Stevens, *TCP/IP Illustrated. Vol. 1: The Protocols*, Addison Wesley, Reading, Mass., 1994, which is incorporated by reference herein.

The memory/data storage unit 408 may include random access memory 426 for use by the processor 406 in executing various applications and in implementing functions of the operating system 418. A read-only memory 428 may also be included to assist in initial start-up and other functions. Executable files for the applications executed by the processor 406 may be stored in the data storage module 430, which may be an optical disk storage unit or a hard drive, for example. The exact nature of the memory/data storage unit 408 may depend on the implementation of the user device. For example, if the user device 400 is a portable phone, then the data storage module 430 may be non-existent.

Figure 5:
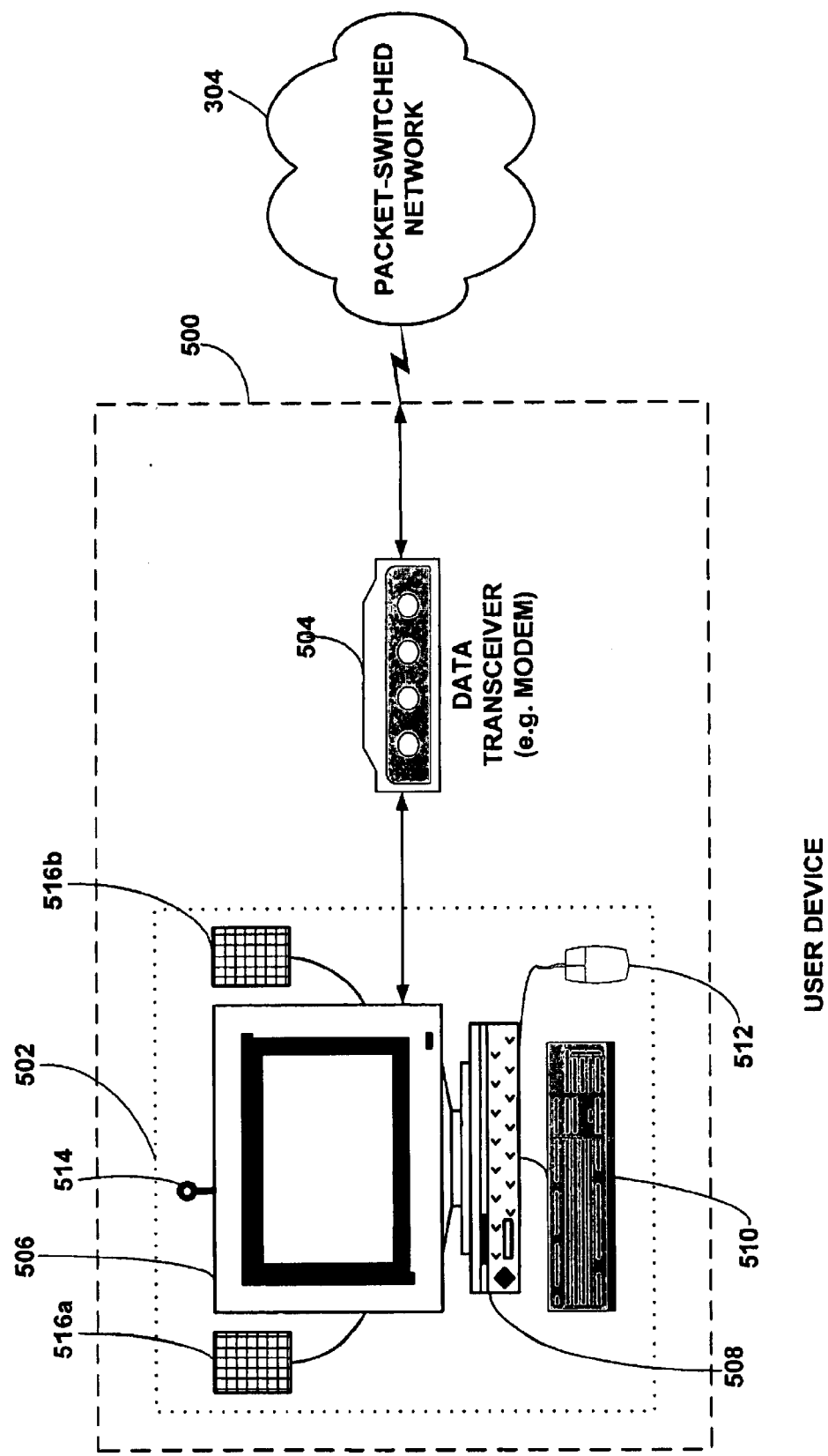
FIG. 5 is a simplified block diagram illustrating a user device according to a preferred embodiment of the present invention.

FIG. 5 is a simplified block diagram illustrating a user device 500 according to a preferred embodiment of the present invention. The user device 500 may be linked to the packet-switched network 304 to access information pertaining to packet-switched telephony service providers, for example. The user device includes a multimedia computer 502 in communication with a data transceiver 504.

The data transceiver 504 performs network interface functions for the user device 500 and may be an analog modem, a cable modem, a DSL (digital subscriber line) modem, or another similar device. In an alternative embodiment, the data transceiver includes a network interface card connecting the multi-media computer 502 to a local area network (not shown) which is connected to the packet-switched network 304. Although FIG. 5 shows the data transceiver 504 as a device external to the multimedia computer 502, it may alternatively be included within the multimedia computer 502 as an internal data transceiver.

The multimedia computer 502 includes a monitor 506, a processing unit 508, a keyboard 510, a mouse 512, a microphone 514, and speakers 516a,b. The monitor is preferably a high-resolution color monitor. The processing unit 508 includes such components as one or more microprocessors on a motherboard, memory, a power supply, one or more buses, device cards, and one or more data storage devices, such as a hard drive or optical storage device. Alternatively, the monitor 506 and the processing unit 508 may be combined into one physical device. Other portions of the user device 500 may be also combined within the one physical device. The keyboard 510 and the mouse 512 are input devices that comprise a portion of a user interface for the user device. The microphone 514 and speakers 516a,b comprise output devices that make up a second part of the user interface for the user device 500. Other input and output devices besides those shown in FIG. 5 may be used in addition to or as alternatives to the devices shown. For example, a video camera could be included to provide visual input for use in videoconferencing.

According to a preferred embodiment of the present invention, the packet-switched network 304 is the Internet, including the World Wide Web, and the user device 500 includes a Web browser application to allow a user to access one or more websites. The user device 500 is operable to accept a call criterion, such as a phone number, address, location description, or e-mail address, from a user by displaying a webpage form on the monitor 506, where the webpage form is downloaded from a website from the server 306 on the packet-switched network 304. When the user has entered one or more call criteria into the Web page form, the user device transmits the one or more call criteria onto the packet-switched network to the Web site, where the server 306 accepts the call criterion and determines available packet-switched telephony service providers corresponding to the call criterion. The server 306 then transmits a listing of available packet-switched telephony service providers back across the packet-switched network to the user at the user device 500. The user preferably will then be given the option to select one of the available packet-switched telephony service providers displayed in a webpage listing obtained from the server 306 across the packet-switched network 304. The service provider selection chosen by the user indicates a preferred service provider for the desired call. The user device may transmit the service provider selection across the packet-switched network 304 to the server 306, which may take further action such as transmitting a request for packet-switched telephony service to the preferred service provider, or initiating a call-connect sequence.

In an additional embodiment, the user device includes an address book application that is operable to display an address book interface to the user. The address book interface includes at least one address book entry (and may possible contain many entries), that may include information such as a contact's name, business, address, phone number, fax number, e-mail address, and other information pertaining to that contact. The user may select an address book entry and may choose to initiate a packet-switched telephony call to the contact corresponding to the selected address book entry. According to an embodiment of the invention, the user may choose to determine available packet-switched telephony service providers to assist in selecting a service provider to support the call. This may be accomplished, for example, by the user clicking on an on-screen button with a mouse pointer directed by the mouse 512, thereby causing the selected address book entry or a portion of the entry to serve as the call criterion that is transmitted to the server across the packet-switched network. This call criterion is used by the server to determine available packet-switched telephony service providers, which are then transmitted back to the user. Alternatively, the transmitted entry could be used by theserver to initiate a call to the selected contact, using the least costly service provider.

B. Server

Figure 6:
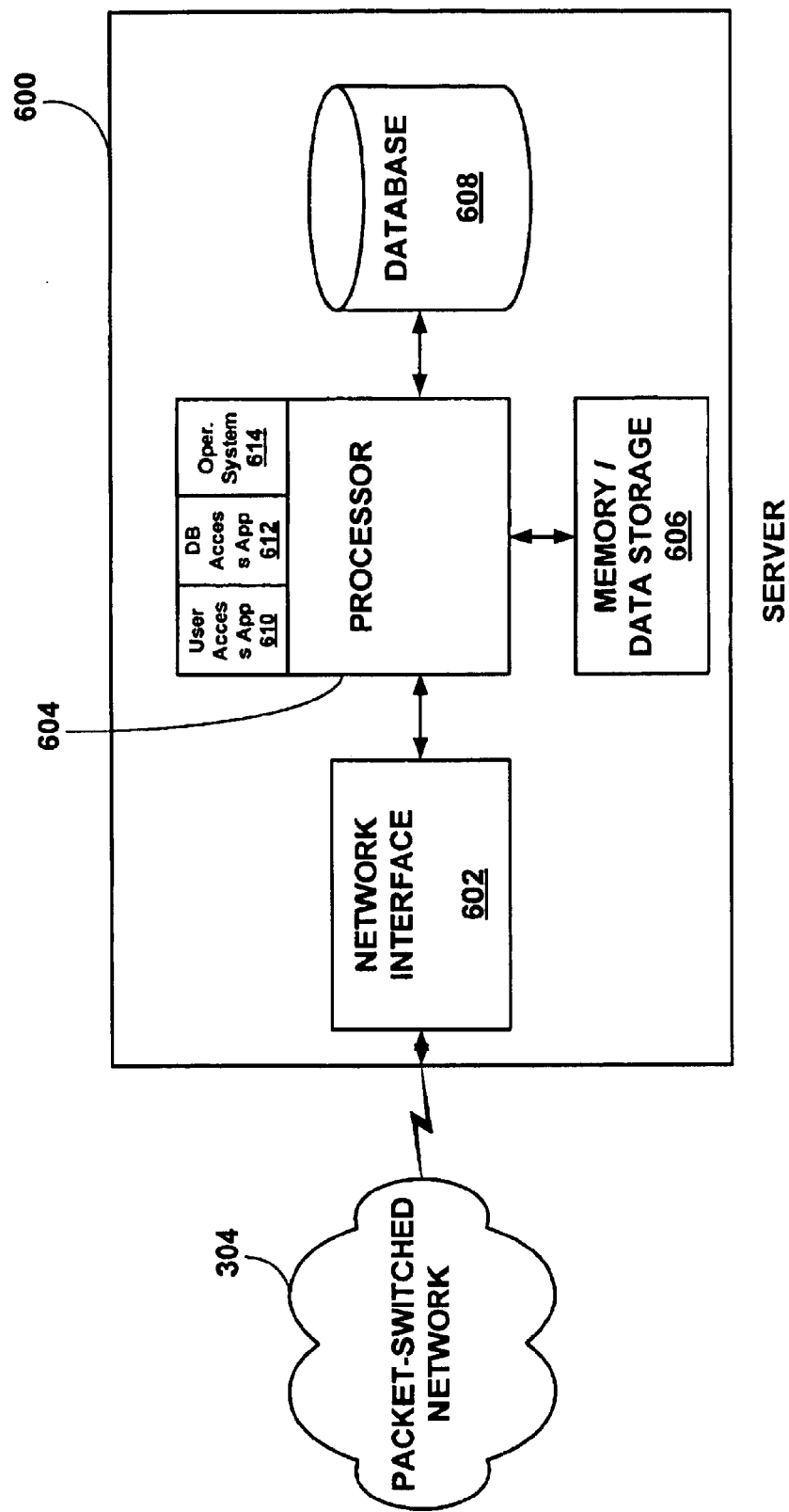
FIG. 6 is a simplified block diagram illustrating a server and packet-switched network according to an embodiment of the present invention.

FIG. 6 is a simplified block diagram illustrating a server 600 and the packet-switched network 304 according to an embodiment of the present invention. The server 600 corresponds to the server 306 in the system 300. Included within the server 600 are a network interface 602, a processor 604, a memory/data unit 606, and a database 608. The database 608 may be a part of the memory/data storage unit 606.

The server network interface 602 links the server 600 to the packet-switched network 304. The network interface 602 may include an analog modem, a cable modem, a DSL modem, or other data transceiver, or it may be a dedicated line to the packet-switched network through a packet-switched network service provider, such as an Internet Service Provider (ISP). When a user accesses the server 600, the network interface 602 handles input and output functions involved with the user access.

The processor 604 may include one or more microprocessors, and is operable to execute one or more applications, such as a user access application 610 and a database access application 612. Other applications may also be included. For example, the server may include an address book application that is accessible by users through the packet-switched network 304, in which users can enter address book entries, which are stored at the server 606 for later access by the user through the packet-switched network 304. Such an application may also be used to provide a call criterion to the server 600. Exemplary preferred embodiment of applications and database structures are contained in the attached source code appendix. The applications 610 and 612 and any other applications are preferably stored in the memory/data storage unit 606. The memory/data storage unit 606 is similar to the memory/data storage unit 408 in the user device 400. The processor 604 may also include an operating system 614, such as the Microsoft Windows NT operating system or the UNIX operating system. Other commercially and proprietary operating systems may also be used.

The database 608 contains information that may be accessed by the processor 604 to provide information to users. The database 608 may be stored in the memory/data storage unit 606, or it may be an external database, and may even be located at a different location on the packet-switched network 304 or some other network. The database 608 is preferably a collection of databases, such as a packet-switched telephony service provider database and a telephone code database, for example. The database 608 may be contained within the memory/data storage unit 606, or it may be external to the server 600. In an alternative embodiment, the database 608 is located at a different location on the packet-switched network 304. A database language, such as SQL (structured query language), may be used for creating, maintaining, and accessing database data. Similarly, the ODBC (Open DataBase Connectivity) standard may be used to access the database 608.

Figure 7:
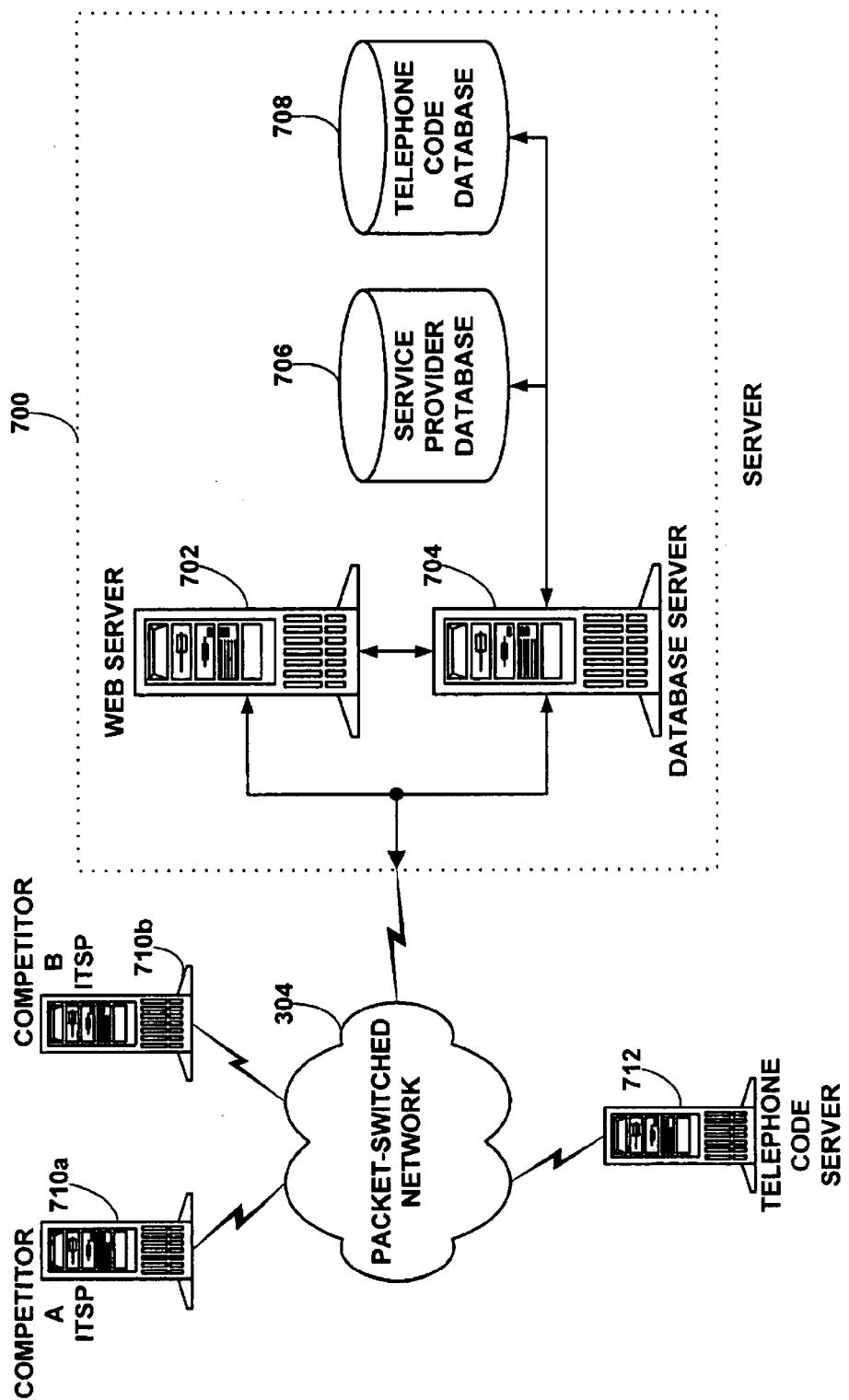
FIG. 7 is a simplified block diagram illustrating a server according to a preferred embodiment of the present invention.

FIG. 7 is a simplified block diagram illustrating a server 700 according to a preferred embodiment of the present invention. The server 700 includes a web server 702 and a database server 704, each having access to the packet-switched network 304. The web server 702 is in communication with the database server 704. The server 700 also includes a service provider database 706 and a telephone code database 708, which may each be accessed by the database server 704.

The packet-switched network 304 is preferably the Internet, including the World Wide Web.

The web server 702 is preferably a Sun Enterprise™ 250 server offered by Sun® Microsystems, operating the Solaris 2.6 UNIX operating system. Web server functions are preferably provided by the Apache HTTP Server—Version 1.3, offered by the Apache Software Foundation. ASP (Active Server Pages) scripts are processed using the Chili!Soft™ ASP port of Microsoft's ASP technology. Other devices, operating systems, and applications may be used to implement the web server 702, as well. VBScript is also used for implementing some of the web server functions. For example, a server running the Microsoft NT operating system may include Microsoft IIS to run ASP scripts. Sun's Java and/or JavaScript may also be used, along with HTML (Hyper Text Markup Language), for implementing the functions of the web server 702. A further example is the use of Oracle Application Server instead of ASP. Additional implementations may also be used to implement the web server 702 and are intended to be within the scope of the present invention.

A database server 704 is also preferably a Sun Enterprise™ 250 server offered by Sun® Microsystems, operating the Solaris 2.6 UNIX operating system. The database server 704 preferably uses the Oracle 8i Internet database application to assist in the creation, maintenance, and accessing of selected databases, such as the service provider database 706 and the telephone code database 708.

The service provider database 706 may be included within the database server 704, and includes service attributes for one or more packet-switched telephony service providers, such as the CompetitorA ITSP 710*a* and the CompetitorB ITSP 710*b* linked to the packet-switched network 304, for example. The service attributes may include such information as a packet-switched telephony service provider's name, locations served, fee structure and prices, required software, quality of service (QoS) information, and other attributes that pertain to packet-switched telephony service providers. The service provider database 706 may be maintained manually, but is preferably maintained by the database server 704 using a modified version of "robot" or "spider" retrieval technology similar to that found in search engines such as AltaVista, HotBot, Infoseek, and Webcrawler. The relevant attribute fields in a packet-switched telephony service provider's website are downloaded to provide the service attributes to the service provider database 706. The update period may be adjusted to obtain timely service attributes.

Table I illustrates the steps which compose the Oracle jobs used for loading ITSP rates, according to a preferred embodiment of the present invention.

TABLE I

| Step | Type | Action | Control |
|---|---|---|---|
| PL/SQL | Query | Deletes old records from the itsp specific rate table. E.g. itsp_rate_deltathree | Number of records deleted is inserted into the delete_from_itsp_rate_load column in a new record in the itsp_rate_load_control table. Manually reconcile against the itsp_rate_load total in prior load record |
| Run ITSP specific perl script | OS command | Scans the ITSP website for the latest rates and puts the rates into a formatted text file | |
| Run SQL Loader | OS command | Loads the data from the perl-generated text file into the itsp specific rate table. | |
| Run PL/SQL | Query | Deletes the old itsp rates from the itsp_rate table. Uses the itsp specific rate mapping table to convert the itsp rates into a standard format and loads these rates into the itsp_rate table. | Number of records inserted by the SQL Loader updates the itsp_rate_load column of the itsp_rate_load_control table for the record inserted in Step 1. Manually reconcile against the delete_from_itsp_rate_load column to see if new records have been added or deleted. Number of records removed from itsp_rate table updates the delete_from_itsp_rate column in new itsp_rate_load_control record. Number of records inserted from itsp_rate table updates the itsp_rate_pc_to_phone column in new itsp_rate_load_control record Manually reconcile against the record generated by loading jobs which ran previously |

The telephone code database 708 is utilized in an embodiment of the invention, in which a user enters a phone number or a portion of a phone number, which serves as a call criterion to be used by the server 700 for determining available packet-switched telephony service providers. The telephone code database 708 may be used in a parsing process, (to be described in further detail with reference to FIGS. 13 and 14A-C) in which the telephone number provided by the user is broken down into one or more sections, such as an international country code, a city or area code, and a local exchange code. The telephone code database contains a listing of these codes and the locations corresponding to the codes. By comparing the international country code, city or area code, and local exchange code for the phone number provided by the user to the codes contained in the telephone code database 708, the server 700 is able to determine the destination location for a call desired by the user. The telephone code database 708 may be maintained manually, or it may be maintained in a manner similar to that described for the service provider database 706, by accessing a telephone code server 712 located on the packet-switched network 304. The telephone code server 712 includes one or more centralized servers that preferably contain accurate and frequently updated mappings of telephone codes with location descriptions.

C. Server Configuration

Figure 8:
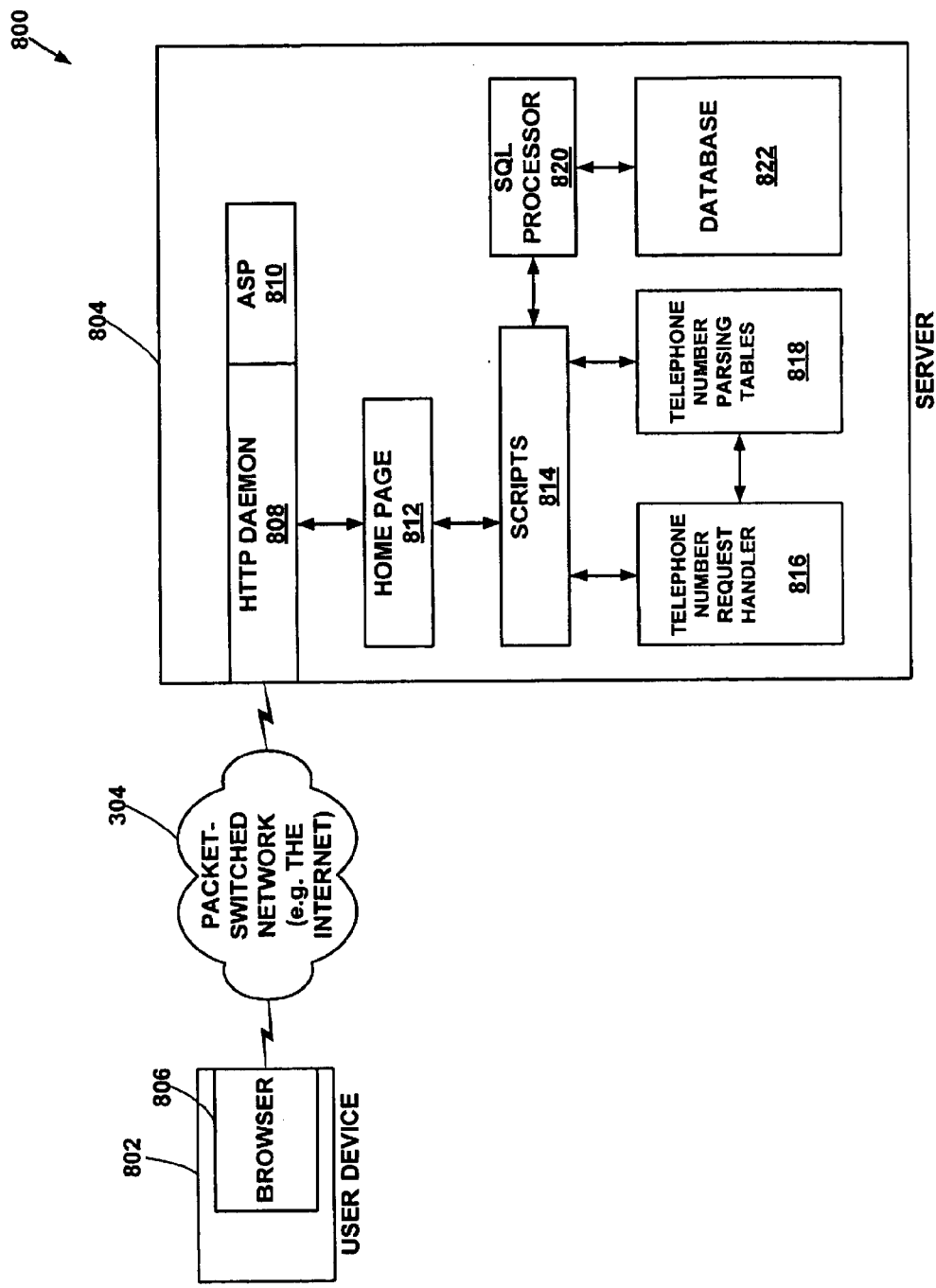
FIG. 8 is a simplified block diagram illustrating an application configuration for a system for obtaining location-specific information using telephone number parsing, according to a preferred embodiment of the present invention.

FIG. 8 is a simplified block diagram illustrating a application configuration for a system 700 for obtaining location-specific information using telephone number parsing, according to a preferred embodiment of the present invention. Such a system may be used to provide a listing of available packet-switched telephony service providers, for example. The system 700 includes a user device 702, the packet-switched network, and a server 704. The user device 702 may correspond to any of the user devices 302, 400, or 500, shown in FIGS. 3, 4, and 5, respectively, and is linked to the packet-switched network 304. The user device 702 includes a browser application 706, such as a web browser for navigating the World Wide Web. Examples of such a browser include the Netscape Navigator or the Microsoft Internet Explorer.

The server 704 may correspond to any of the servers 306, 600, or 700, which are illustrated in FIGS. 3, 6, and 7, respectively. The server 704 is linked to the packet-switched network 304 and may include one or more server devices, such as the SUN Enterprise™ 250 server. In a preferred embodiment, the server 704 uses the configuration shown for the server 700 in FIG. 7. The server 704 includes an HTTP (Hyper Text Transfer) Daemon 708 to assist in implementing communications between the server 804 and the user device 802. HTTP is the preferred protocol used by the server 804 and the browser 806 in the user device 802 to communicate over the packet-switched network 304. An ASP module 810 works in conjunction with the HTTP Daemon 808 to assist with server functions. A home page module 812 is in communication with the HTTP Daemon 808 and provides a graphical interface in the form of a Web page that is viewable by a user accessing the server 804. The home page 812 provides access to scripts 814, which include one or more application modules for executing various processes. For example, the scripts 814 may be used to determine available packet-switched telephony service providers for a call criterion, such as a telephone number. For this case, a telephone number request handler 816 and telephone number parsing tables 818 are used to break down the telephone number entered as a call criterion into one or more telephone codes, such as a country code, city and area codes, and a local exchange code, for example. These codes could be used by the scripts 814 to access a database 822 using a SQL processor 820.

The database 822 includes information that may be searched using the telephone codes as search parameters. For example, if available packet-switched telephony service providers are to be determined, then the database 822 will include service attributes for one or more service providers. The service attributes may include cost information, for example, that may be used to rank a listing of available packet-switched telephony providers based on cost. Other ranking schemes may also be used.

The implementations shown and described in the server 804 are preferred implementations. Alternative implementations may also be used. For example, a CGI (Common Gateway Interface) module may be substituted for the ASP module 810 to perform the server actions, such as searching or running applications when the user clicks on certain screen buttons or parts of a Web screen on the user's web browser. The scripts 814 are sets of machine readable instructions, such as instructions written in VB-Script, Java, or Javascript, for example. Similarly, other application components within the server 804 may be replaced by alternative implementations. The application configuration shown in FIG. 8 is a preferred configuration, and other configurations may work equally as well, including configurations that do not utilize the World Wide Web. Exemplary embodiments of many of these applications and database schemes are included in the attached source code appendix.

III. Methods for Identifying Service Providers

Figure 9:
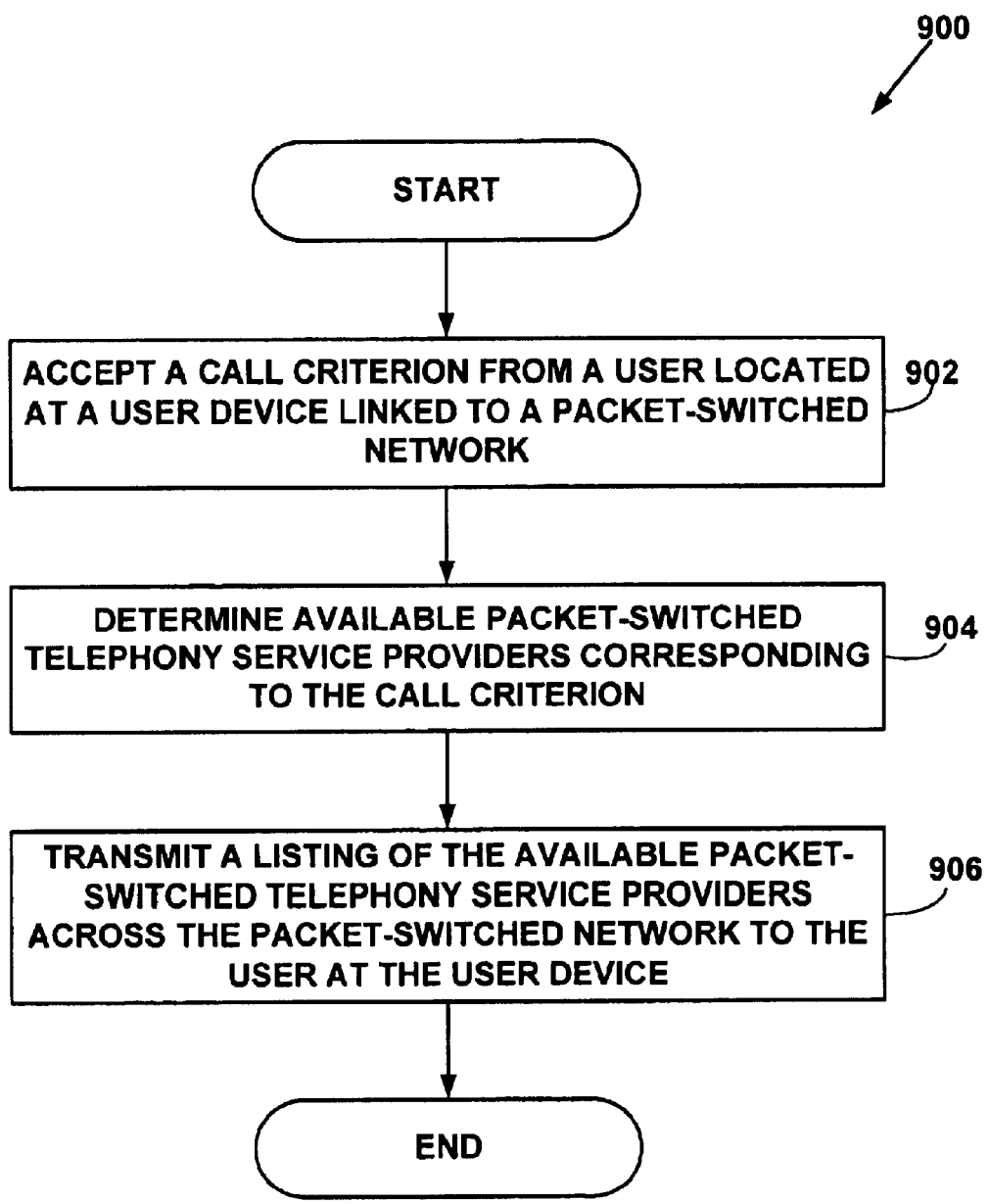
FIG. 9 is a flow diagram illustrating a method for identifying available packet-switched telephony service providers, according to an embodiment of the present invention.

FIG. 9 is a flow diagram illustrating a method 900 for identifying available packet-switched telephony service providers, according to an embodiment of the present invention. The method 900 preferably is implemented at a server, such as one of the servers 306, 600, 700, or 804, shown respectively in FIGS. 3, 6, 7, and 8. In step 902, a call criterion is accepted from a user located at a user device linked to a packet-switched network. The call criterion is used to determine available packet-switched telephony service providers corresponding to the call criterion, as shown in step 904. In step 906, a listing of the available packet-switched telephony service providers is transmitted across the packet-switched network to the user located at the user device. The method 900 may be implemented as instructions stored on a computer readable medium for causing a processing unit to execute the method 900. For example, the computer readable medium could be memory or long-term data storage capable of storing one or more applications. The instructions are preferably implemented in a programming language, such as VB Script, Javascript, or Java, for example. Many other programming languages may also be used to implement instructions for causing a processing unit to execute the method 900. The processing unit may include one or more microprocessors.

In a preferred embodiment, the packet-switched network is the Internet. The call criterion is preferably a telephone number or a portion of a telephone number, but may additionally or alternatively be a geographic description, a mail code such as a zip code, a price specification, or another type of criterion. The user device, from which the call criterion is accepted and to which the listing of available packet-switched telephony service providers is transmitted, preferably includes a browser operating on a computer, in which the call criterion is entered by the user on a first web page and the listing of the available packet-switched telephony service providers is displayed on a second web page on the web browser. In an alternative embodiment, an address book application assists the user in providing the call criterion. Such an address book application may be located on the user device or it may be accessed from the server through the packet-switched network by the user device, as may be the case if the address book application is an on-line address book according to an embodiment of the present invention. If the address book application is located on the user device, then the user may select an address book entry or a portion thereof to serve as the call criterion that is transmitted to and accepted by the server. If the address book application is an on-line web-based application located on the server and accessed by the user device via the packet-switched network, then the user may select an address book entry to cause one or more call criteria to be accepted as shown in 902.

In a preferred embodiment of the invention, the step of determining available packet-switched telephony service providers (step 904) includes determining a geographic location corresponding to the call criterion and accessing a packet-switched telephony service provider database to determine packet-switched telephony service providers offering telephony service to the geographic location. Additionally, service attributes may be determined that correspond to the packet-switched telephony service providers offering telephony service to the geographic location. The service attributes are associated with each of the available telephony service providers, and may include information such as a price specification, a specification of service limitations, or other telephony service provider characteristics that may assist in making a decision as to which telephony service provider to select. In a further embodiment, the call criterion includes a telephone number having one or more of an international country code, a city code (or area code), and a local exchange code. The telephone number may then be parsed into the international country code, the city code (or area code), and the local exchange code. A telephone code database may be accessed to determine the geographic location.

The step of transmitting a listing of the available packet-switched telephony service providers (step 906) may further include ranking the available packet-switched telephony service providers according to a ranking scheme. The ranking scheme may include arranging the available packet-switched telephony service providers into a hierarchical list based on the call criterion. A sort criterion may also be accepted from the user in step 902 to assist in ranking the service providers. For example, the call criterion could be a phone number while the sort criterion is a specification of the lowest available price. Alternatively, a default sort criterion may be used, such as sorting by lowest available price per unit time for a desired call.

Figure 10:
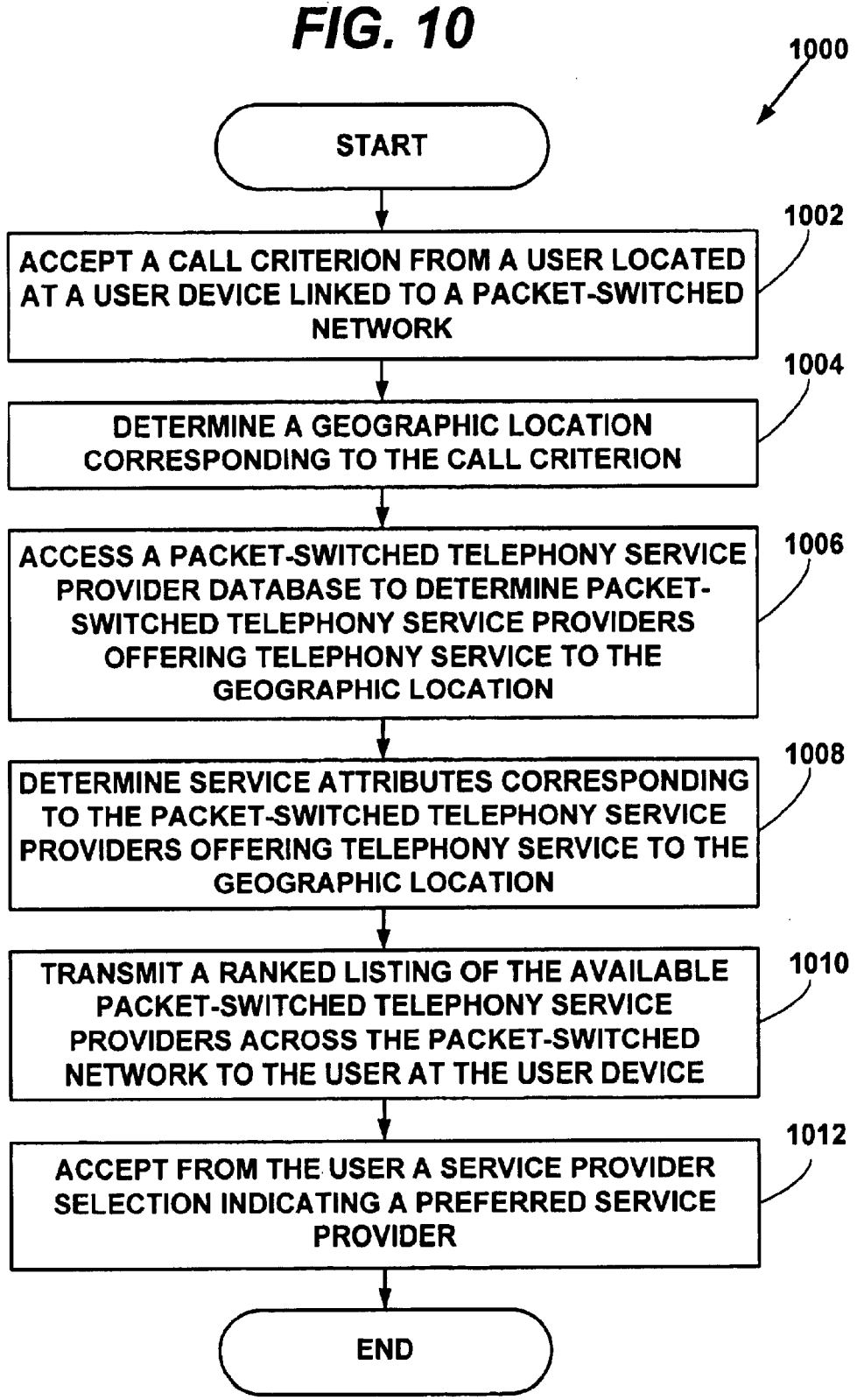
FIG. 10 is a flow diagram illustrating a method for selecting a provider of a packet-switched telephony call according to an embodiment of the present invention.

FIG. 10 is a flow diagram illustrating a method 1000 for selecting a provider of a packet-switched telephony call according to an embodiment of the present invention. The method is preferably implemented at a server on a packet-switched network. For example, the server may be any one of the servers 306, 600, 700, or 804 shown in FIGS. 3, 6, 7, or 8, respectively. In step 1002, a call criterion is accepted from a user located at a user device linked to the packet-switched network. A geographic location corresponding to the call criterion is determined, as shown in step 1004. The server accesses packet-switched telephony service provide database to determine packet-switched telephony service providers offering telephony service to the geographic location, as shown in step 1006. In step 1008, a determination is made as to service attributes corresponding to the packet-switched telephony service providers offering telephony service to the geographic location. A ranked listing of the available packet-switched telephony service providers is transmitted across the packet-switched network to the user at the user device, as shown in step 1010. The server then accepts from the user a service provider selection indicating a preferred service provider. Alternatively, an unranked listing may be transmitted to the user to be ranked by the user device.

The service attributes determined in step 1008 may include such information as pricing information, service characteristics, and/or software needed, for example. These attributes may be used to rank the available telephony service providers. A sort criterion may be accepted from the user to specify which service attribute to sort by for the available service providers. Alternatively, a default sort criteria, such as the lowest cost provider, to rank the available service providers.

In a further embodiment of method 1000, the server transmits a request for packet-switched telephony service to the preferred service provider selected by the user. The request for packet-switched telephony service may include a telephone number, such as a telephone number serving as the call criterion provided by the user. Alternatively, the server may initiate a call to the desired call destination using packet-switched telephony service provided by the selected packet-switched telephony service provider. A contractual arrangement may exist between the administrator of the server and the packet-switched telephony service provider to enable this function. Other implementations may also be used.

The call criterion utilized in method 1000 is preferably a location description or a telephone number. The step of determining a geographic location corresponding to the call criterion (step 1004) includes parsing the telephone number into an international country code, a city or area code, and a local exchange code. The geographic location may then be determining by accessing a telephone code database. The telephone code database includes fields for telephone codes, such as country codes, city codes and/or area codes, and local exchange codes. Additional fields may include geographic locations, such as countries, states or provinces, cities, and other subdivisions. Other fields may also be included, such as postal codes.

In an alternative embodiment, steps 1010 and 1012 in the method 1000 are replaced by the server selecting a preferred service provider according to a sort criterion, such as the lowest cost service provider for the desired call. The server may then forward the user to a server operated by the preferred packet-switched telephony service provider, or the server may simply initiate the call to the desired telephone subscriber using service provided by the selected packet-switched telephony service provider.

As another alternative embodiment, the call criterion may derive from an address book application located on the server or at the user device. When the user selects a particular address book entry to call, the call criterion corresponding to the address book entry is used to determine the geographic location corresponding to the call criterion (step 1004).

Figure 11:
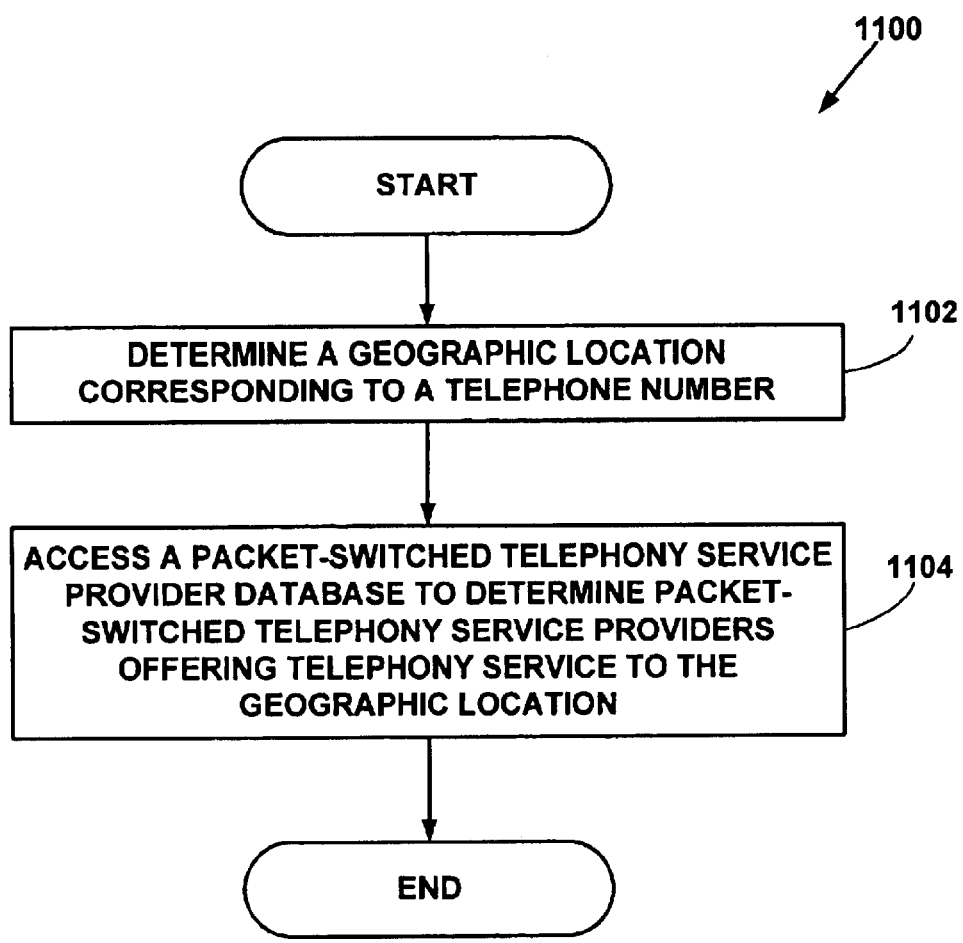
FIG. 11 is a flow diagram illustrating a method for identifying available packet-switched telephony service providers, according to an embodiment of the present invention.

FIG. 11 is a flow diagram illustrating a method 1100 for identifying available packet-switched telephony service providers, according to an embodiment of the present invention. The method 1100 may be implemented at a server or at a user device, for example. A geographic location corresponding to a telephone number is determined, as shown in step 1102. In step 1104, a packet-switched telephony service provider database is accessed to determine packet-switched telephony service providers offering telephony service to the geographic location.

For the method 1100, the telephone number preferably includes an international country code, a city code (or area code), and a local exchange code. A preferred technique for determining the geographic location corresponding to the telephone number (step 1102), includes parsing the telephone number into the international country code, the city code (or area code), and the local exchange code. A telephone code database is then accessed to determine the geographic location.

The method 1100 may further include (1) determining the least costly service provider for the desired call, and (2) initiating a call from the user to the telephone number, using the least costly service provider.

Figure 12:
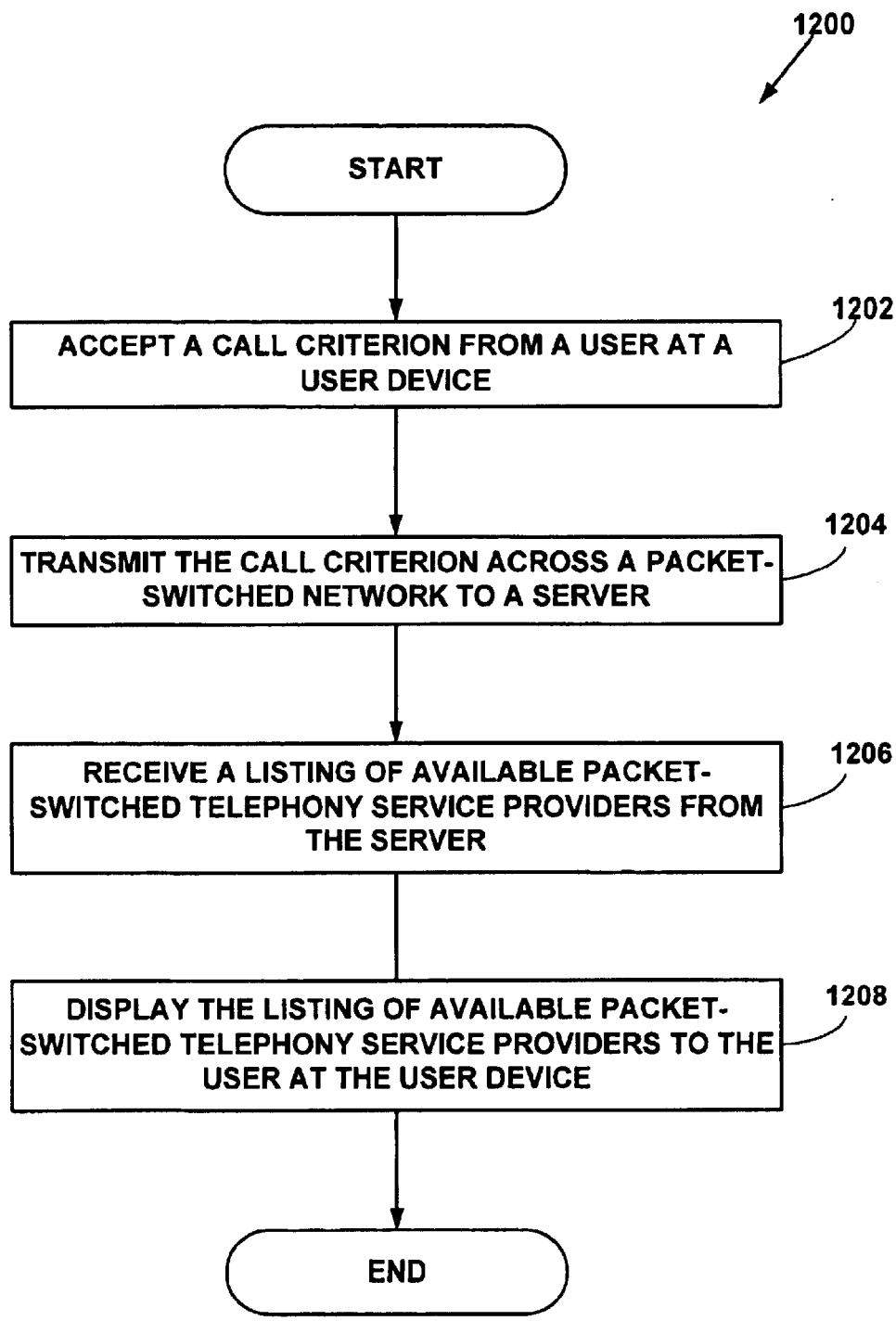
FIG. 12 is a flow diagram illustrating a method for identifying available packet-switched telephony service providers from a user device, according to an embodiment of the present invention.

FIG. 12 is a flow diagram illustrating a method 1200 for identifying available packet-switched telephony service providers from a user device, according to an embodiment of the present invention. In step 1202, a call criterion is accepted from a user at a user device. In step 1204, the call criterion is transmitted across a packet-switched network to a server. In step 1206, the user device receives a listing of available packet-switched telephony service providers from the server. In step 1208, the listing of available packet-switched telephony service providers is displayed to the user at the user device.

The packet-switched network is preferably the Internet, and the prospective caller device preferably includes a computer or processor executing a web browser operable to display one or more web pages. The call criterion preferably includes at least a portion of a telephone number, which is used by the server to determine the available packet-switched telephony service providers. The list of available packet-switched telephony service providers received from the server may be arranged hierarchically according to a ranking scheme, such as one based on price.

The method 1200 may further include accepting a service provider selection from the prospective caller to indicate a preferred service provide. The service provider selection may then be transmitted to the server across the packet-switched network. The server may use the service provider selection to initiate a call to the desired call destination using the preferred service provider, or it may be used to provide information on the preferred service provider to the user.

As with previously described embodiments of the present invention, the method 1200 may use an address book application to accept the call criterion from the user. The address book application itself may be located on the user device or it may exist on the server to be displayed to the user via a web page, for example. Additional implementations may also be used and are intended to be within the scope of the present invention.

IV. Identifying Location-Specific Information

Figure 13:
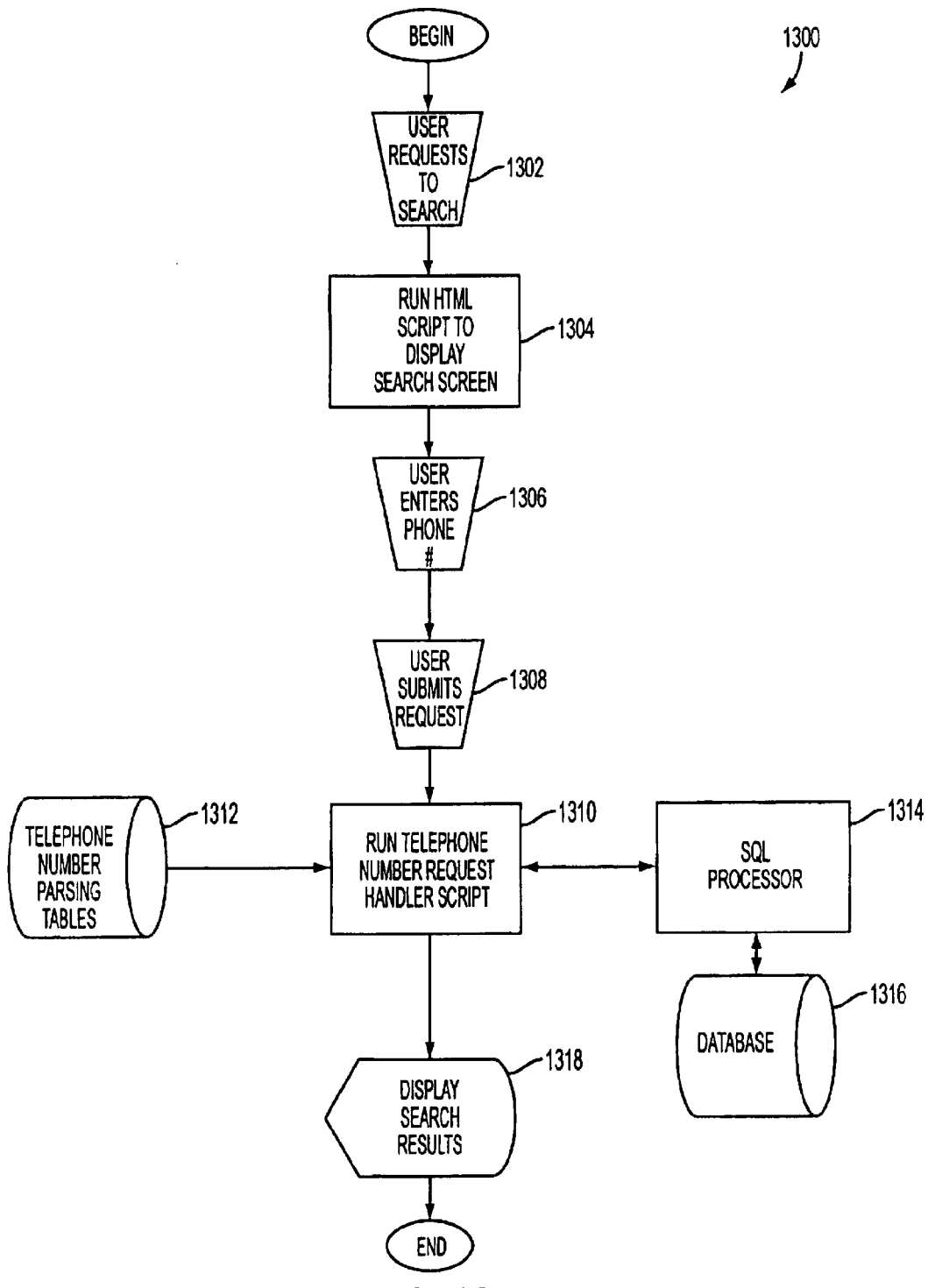
FIG. 13 is a flow diagram illustrating a method for identifying information that is specific to a geographic location, according to one embodiment of the present invention.

Although much of the description accompanying FIGS. 1-12 has focused on systems and methods for identifying a packet-switched telephony service provider, the techniques disclosed herein may be used to identify many types of information that pertain to the call criterion. FIG. 13 is a flow diagram illustrating a method 1300 for identifying information that is specific to a geographic location, according to one embodiment of the present invention. The method 1300 may used in conjunction with the methods 900, 1000, 1100, or 1200. The method 1300 may also be used for applications that are unrelated to packet-switched telephony.

In step 1302, a user located at a user device, such as the user device 302, 400, or 500, sends a request to search for information to a server located on a packet-switched network. This request may be performed by the user utilizing a web page administered by the server. For example, the web page may be a home page having a plurality of selections, including, for example, options to search, obtain help, or access a site map. Additional implementations for step 1302 may also be used. In step 1304, the server runs a script to display a search screen to the user. The script is preferably an HTML script that results in a web page being transmitted across the packet-switched network to be viewed on the user device. The search screen will preferably contain a field for entering a search string, such as one or more character strings, and may also contain additional fields for further narrowing a search. The user is given the option to send the search query across the packet-switched network to the server. This may be accomplished by the user clicking on an on-screen button, for example. In the preferred embodiment of the method 1300, the user enters a telephone number into a search field on the search screen, as shown in step 1306. The user then submits this request to the server, as shown in step 1508. Upon receiving the user's search request, a telephone number request handler script is executed at the server, as shown in step 1310. The telephone number request handler script accesses telephone number parsing tables 1312 to determine a geographic location corresponding to the telephone number entered by the user in step 1306. This determination is made by dividing the telephone number into various telephone number codes, such as an international country code, a city or area code, and possibly a local exchange code. A subset of these codes may also be used. The telephone number parsing table 1312 contains geographic locations that correspond to the broken-down codes to enable the geographic location corresponding to the telephone number to be determined. A database processor, such as an SQL processor, then accesses a database 1316, as shown in 1314, in order to determine information that is specific to the geographic location corresponding to the entered telephone number. For example, the database 1316 may contain a list of businesses located near the destination corresponding to the entered telephone number. Many other types of information may be stored in the database 1316. The database 1316 is organized by including fields corresponding to various geographic locations (and/or telephone codes, or postal codes), and fields containing geographic-specific information. After the information pertaining to the entered telephone number is determined, the search results are displayed to the user, as shown in step 1318. This may be accomplished by the server transmitting a results web page across the packet-switched network to be displayed on the user device.

The method 1300 may be used as part of a system or method to identify available packet-switched telephony service providers. For example, the phone number entered in step 1306 may be used as the call criterion described with reference to the systems and methods shown in FIGS. 3-12. The database 1316 may contain packet-switched telephony service provider information, along with the geographic locations serviced by the various packet-switched telephony service providers. Modifications may be made to the method 1300 with departing from the intended scope of the present invention.

Figure 14A:
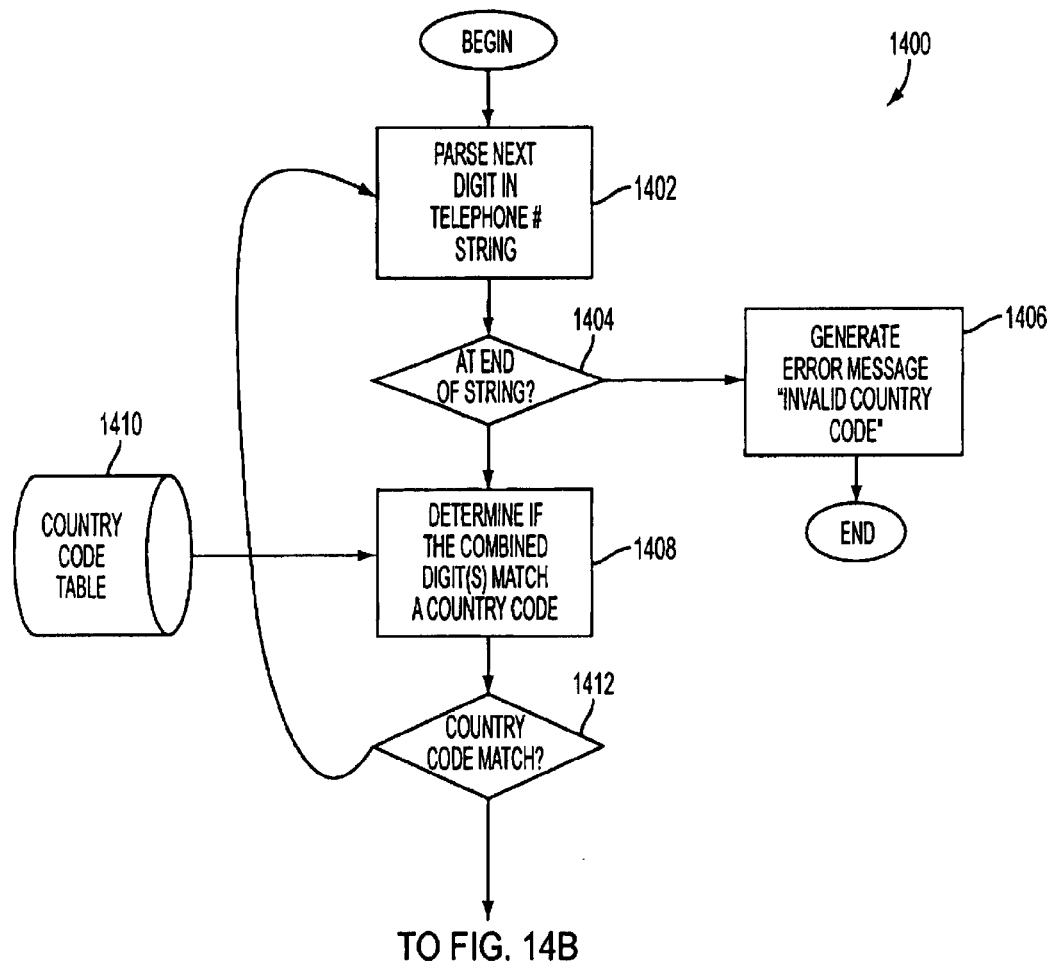
FIGS. 14A-C are a flow diagram illustrating a method for determining location-specific information corresponding to a telephone number, according to a preferred embodiment of the present invention.
Figure 14B:
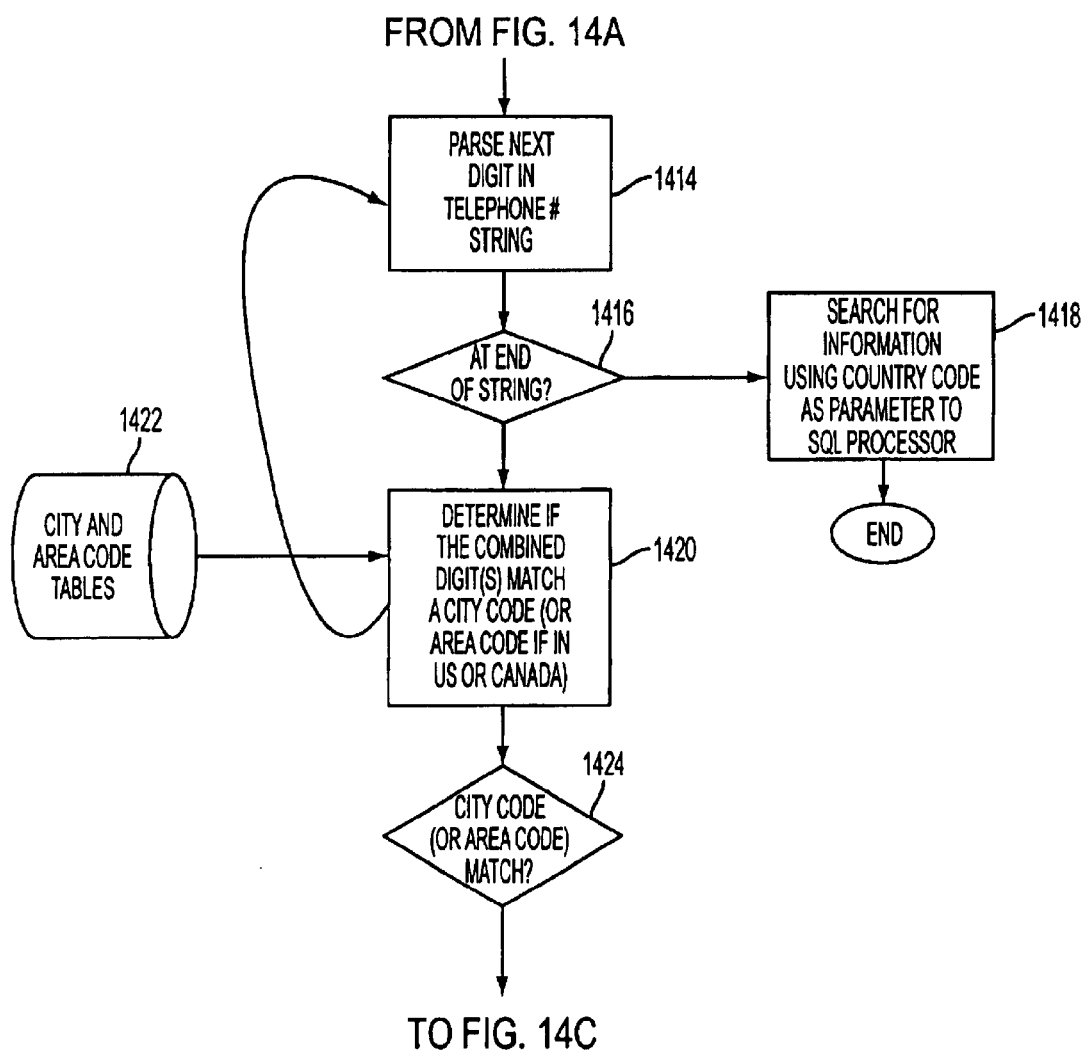
Figure 14C:
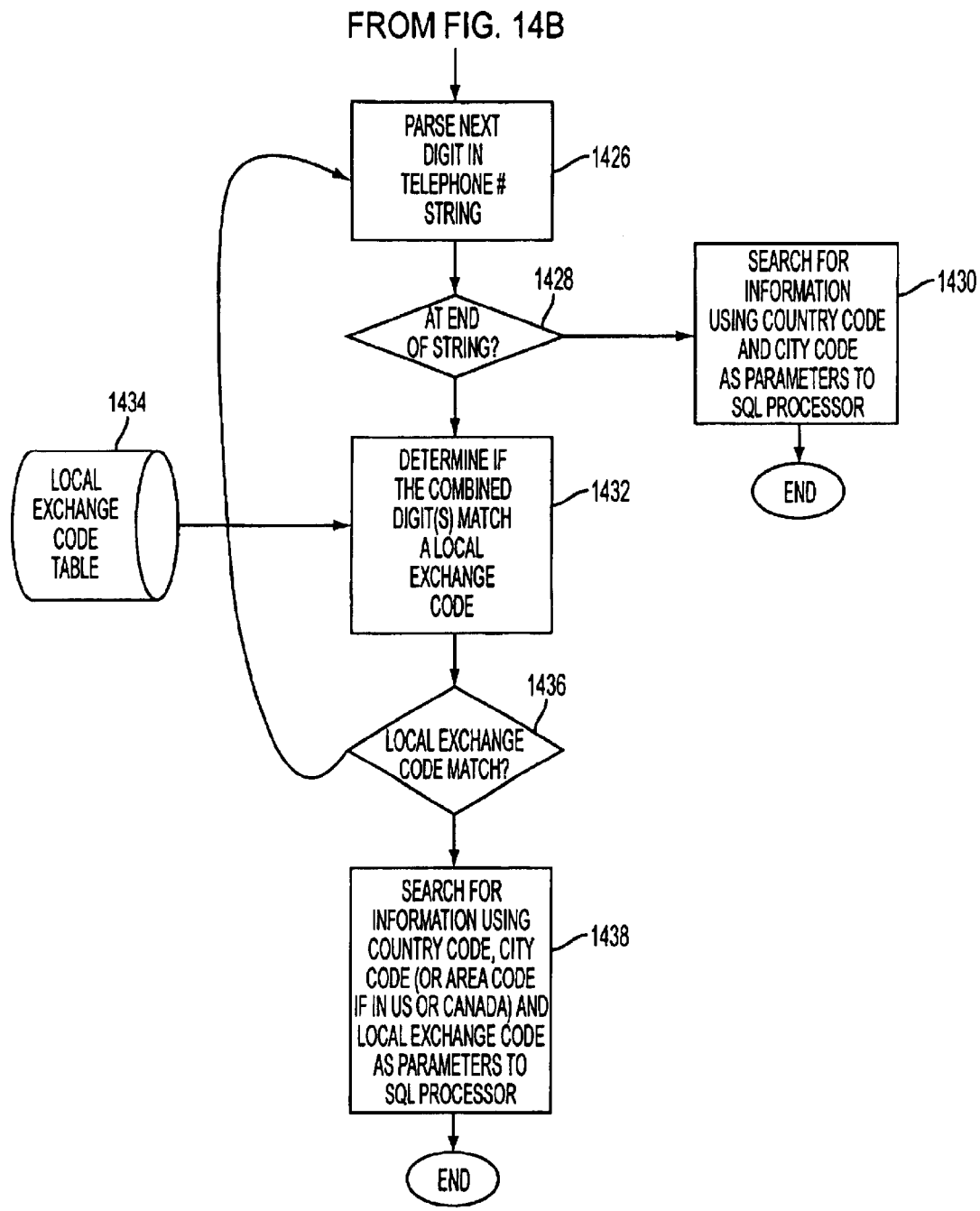

FIGS. 14A-C are a flow diagram illustrating a method 1400 for determining location-specific information corresponding to a telephone number, according to a preferred embodiment of the present invention. The method 1400 may be used, for example, to implement functions of the database server 704 in the server 700 shown in FIG. 7, portions of the server 804 shown in FIG. 8, step 904 in the method 900 of FIG. 9, steps 1004–1008 in the method 1000 of FIG. 10, the method 1100 of FIG. 11, and steps 1310–1316 in the method 1300. In step 1402, an initial digit in a telephone number string is parsed. Parsing may consist simply of isolating the number for further operations within the method 1400. A determination is made as to whether the end of the string has been reached (thus resulting in no digit to be parsed), as shown in step 1404. If the end of the string has been reached, then an error message is generated indicating an invalid country code, as shown in step 1406. Step 1404 may be skipped in a system containing single-digit country codes. If it is determined in step 1404, that the parsing process has not reached the end of the telephone number string, then a determination is made as to whether the combined digit(s) from the parsing process match a country code, as shown in step 1408. A country code table 1410 may be accessed to assist in making this determination. If the combined digit(s) do not match a country code contained in the country code table 1410, then the next digit in the telephone number string is parsed, as shown in step 1402. The parsing preferably progresses in a left to right manner, as is conventional for most telephone numbering systems. Steps 1402–1412 are repeated until either an "invalid country code" message is generated in step 1406, or a country code match is determined in step 1412. If the combined digits match a country code, then the next digit in the telephone number string is parsed, as shown in step 1414. A determination is made as to whether the end of the telephone number string has been reached, as shown in step 1416. Step 1416 is very similar to step 1404. If the end of the string has been reached, then the country code is used as a parameter to search for information corresponding to the identified country code, as shown in step 1418. If the end of the telephone string has not been reached, then the method 1400 contains in an attempt to identify a city/area code for the telephone number string. A determination is made as to whether the combined digit(s) match a city code (or area code if in the United States or Canada), as shown in step 1420. The combined digit(s) preferably do not include the already-identified country code, and may include only one digit during the first execution of steps 1414–1420. City and area code tables 1422 are utilized in step 1420 to determine whether a match exists. If there is no match between the combined digit(s) and a city or area code, then the next digit in the telephone number string is parsed, as shown in step 1414. Steps 1414–1424 are repeated until either the end of the string has been reached (without identifying a valid city and/or area code), or a city code or area code match has been identified in step 1424. If it is determined that the combined digit(s) match a city code or area code, then the next digit in the telephone string is parsed, as shown in step 1426. A determination is then made as to whether the end of the telephone number string has been reached, as shown in step 1428. Step 1428 corresponds to steps 1404 and 1416 in the country code and city/area code parsing processes. If the end of the string has been reached, then the determined country and city/area code are used as parameters for searching for information, as shown in step 1430. If the end of the string has not been reached, then a determination is made as to whether the combined digits match a local exchange code, as shown in step 1432. Step 1432 may involve utilizing a local exchange code table 1434 to determine whether a match exists. Step 1432 is very similar to steps 1408 and 1420. In step 1436, a determination is made as to whether the combined digits match a local exchange code. If no match exists, then the next digit in the telephone number string is parsed, as shown in step 1426. Steps 1426–1436 are repeated until either the end of the string has been reached, without identifying a valid local exchange code, or a local exchange code match is identified. If a local exchange code match is identified, then the identified country code, city code (or area code), and local exchange code are used as parameters for initiating a search for location-specific information, as shown in step 1438.

Although the method 1400 includes processes for identifying a country code, a city/area code, and a local exchange code in a telephone number string, the method 1400 may also be used with a subset of these processes. For example, steps 1402–1412 may be omitted if the telephone number string is not intended to contain a country code. Such may be the case for searches intended to provide results for a single country only. Additionally, although telephone codes are used for determining a geographic location in the method 1400, postal code parsing may also be used, as may other location-specific parsing parameters.

V. Exemplary User Interfaces

Figure 15:
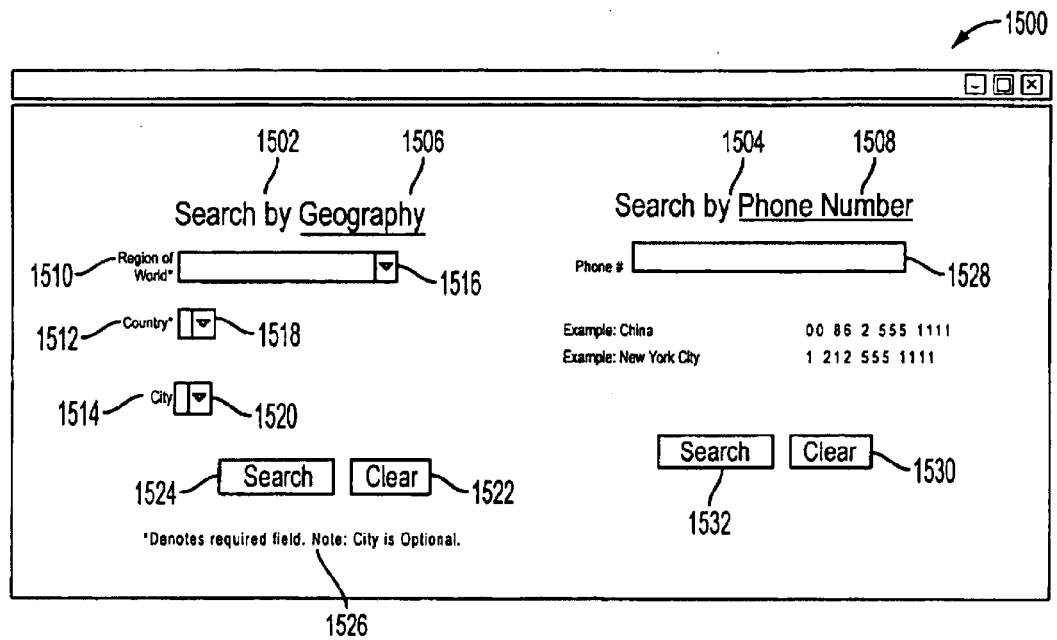
FIG. 15 is a pictorial diagram illustrating a web page from which a user may specify one or more call criteria, according to a preferred embodiment of the present invention.

FIG. 15 is a pictorial diagram illustrating a web page 1500 which a user may specify one or more call criteria, according to a preferred embodiment of the present invention. The web page 1500 includes a "search by geographic" field 1502 and "search by phone number" field 1504. A geography help hyperlink 1506 may be selected by the user to obtain information about syntax, language, and other information that may assist the user in entering a call criterion. For example, the hyperlink 1506 may cause another web page to be transmitted from a server across a packet-switched network to a user device for viewing by the user. Similarly, a phone number hyperlink 1508 may provide assistance to the user in entering a desired phone number to call. Included within the geography query field 1502 are portions for specifying a geographic location, which may serve as a call criterion for the present invention. A "region of world" field 1510 may be used by the user to specify a region of the world, such as a continent. A "country" field 1512 may be used by the user to specify a country located within the specified region. A "city" field 1514 may be used by the user to specify a city within the country to which a desired call is to be placed. A series of pull-down lists 1516, 1518, and 1520 may be implemented to assist in specifying the geographic location. Such a system preferably uses a "drill-down" system, in which the choices available for a lower-level field are narrowed by the selection of a higher-level field.

For example, if the region of the world is specified as "Asia-Pacific" in the "region of the world" field 1510, then the countries available in the pull-down list 1518 will only contain countries within the Asia-Pacific region of the world. A "clear" on-screen button 1522 may be selected by the user to reset specifications made. For example, the user may use a mouse to cause a pointer to click on the clear button to initiate the clear operation. A "search" on-screen button 1524 may be selected by the user to cause the location description entered in the search query field 1502 to be transmitted from the user device across the packet-switched network to the server, to be used as a call criterion according to various embodiments of the present invention. An instruction field 1526 is included to provide information to the user on entering location description information. For example, the city may be an optional field, which may be the case when packet-switched telephony service providers charge the same fee for an entire country.

The phone query field 1504 includes a phone number field 1528. The user may enter a telephone number or a portion of a telephone number into the phony number field 1528. A "clear" on-screen button 1530 may be included to allow the user to clear an entered phone number. A "search" field 1532 may be selected by the user to cause the phone number entered in the phone number field 1528 to be transmitted from the user device across the packet-switched network to the server for use as a call criterion according to various embodiments of the present invention.

Figure 16:
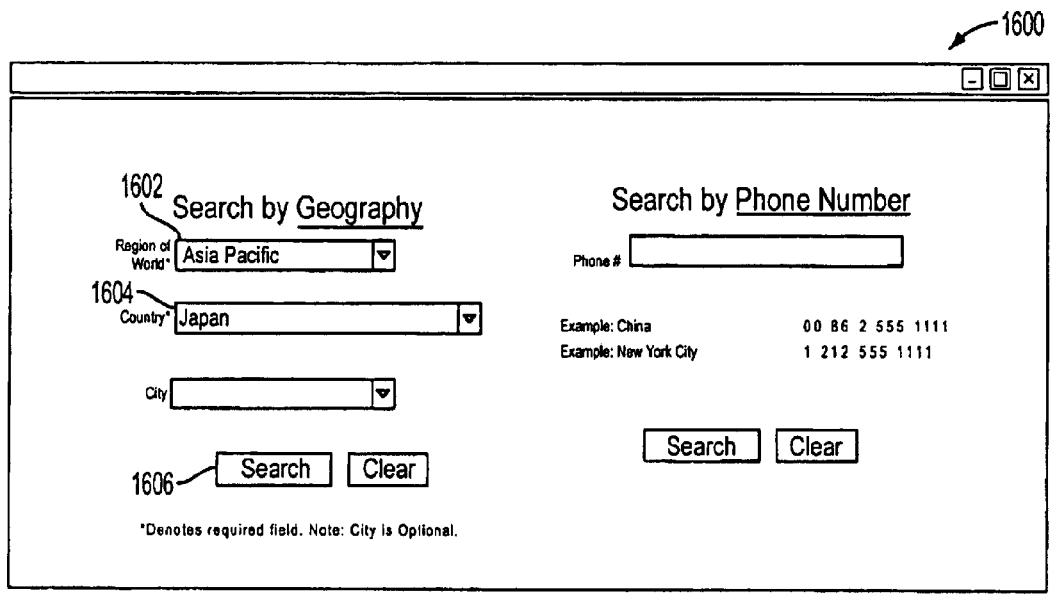
FIG. 16 is a pictorial diagram illustrating a web page for accepting one or more call criteria from a user, according to an exemplary embodiment of the present invention.

FIG. 16 is a pictorial diagram illustrating a web page 1600 for accepting one or more call criteria from a user, according to an exemplary embodiment of the present invention. The web page 1600 shows a user's selection 1602 of "Asia Pacific" as the specified region of the world. The user selection 1604 of "Japan" as the specified country is also shown. The user may press the "search" on-screen button 1606 to transmit the selection 1602 and 1604 to be used one or more call criteria.

FIG. 17 is a pictorial diagram illustrating web page 1700 showing a listing of available packet-switched telephony service providers, according to an exemplary embodiment of the present invention. The web page 1700 may be displayed to the user on the user device in response to the user entering a call criterion, such as a telephone number or location description, for example. For the example shown in FIG. 17, available service providers for calling to Japan are shown.

The web page 1700 may include a circuit-switched service provider listing 1702 and a listing of available packet-switched service providers 1704. Alternatively, either of the listings 1702 or 1704 may be omitted from the web page 1700. The listing of circuit-switched service providers 1702 illustrates that calls to Japan through circuit-switched provider A are charged at a rate of 16¢/minute, when the call originates from the United States. Additional circuit-switched providers may also be listed in the listing 1702. The listing of available packet-switched service providers 1704 includes fields describing service attributes for available packet-switched telephony service providers. These fields may include a call provider field 1706, a calling rate field 1708, a monthly fee field 1710, an initial pre-pay amount field 1712, a software download required field 1714, a call origin restrictions field 1716, and a call time restrictions field 1718. Additional or alternative fields may also be included, and any of the fields 1706–1718 may be omitted depending on the service attributes to be presented to the user. A "full details" hyperlink field 1720 may be included to allow the user to obtain further information about the selected service providers. For the listing 1704, three available service providers are shown. Information provided includes competitor A's service attributes 1722, competitor B's service attributes 1724, and competitor C's service attributes 1726. Information for a particular service provider may be obtained by referencing a row for a particular service provider and examining the service attributes identified by the column headers. For example, competitor B's calling rate is listed as 11¢/minute, with an initial prepay amount of $25.

Figure 18:
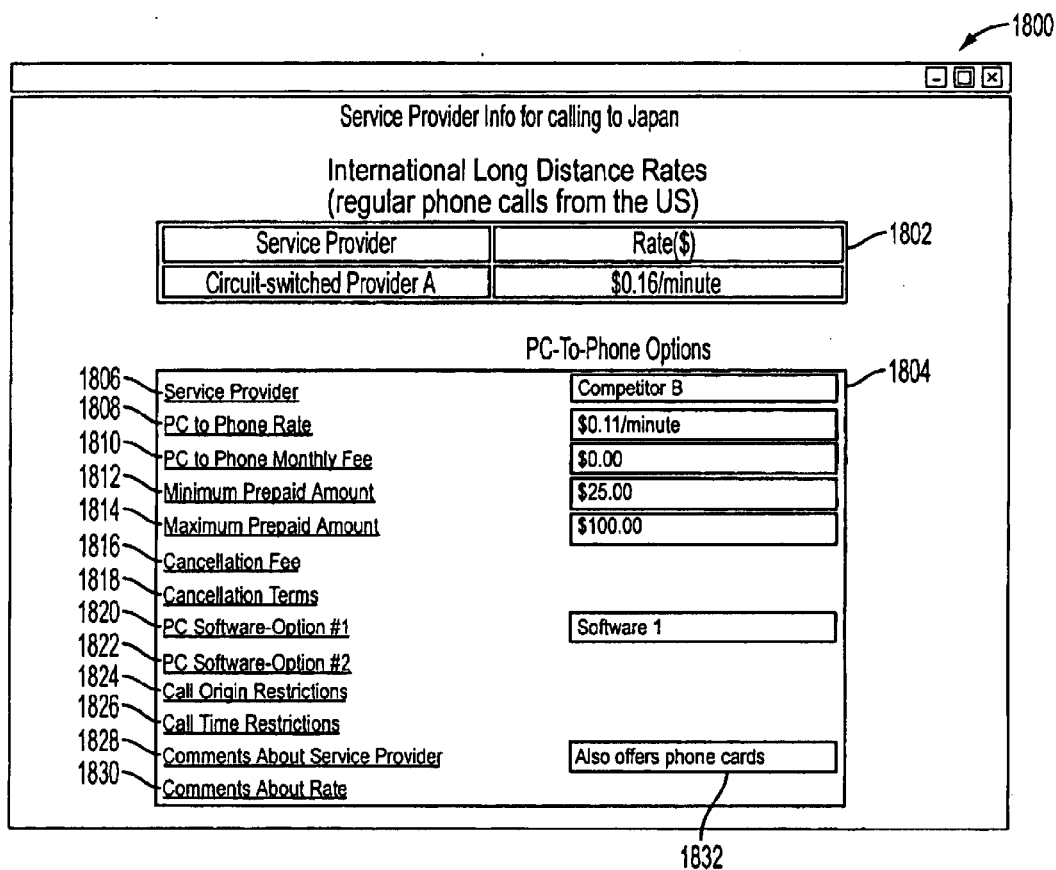
FIG. 18 is a pictorial diagram illustrating a service provider information web page, according to an exemplary embodiment of the present invention.

FIG. 18 is a pictorial diagram illustrating a service provider information web page 1800, according to an exemplary embodiment of the present invention. In this example, information corresponding to the competitor A 1722 is shown. The web page 1800 may, for example, be displayed in response to the user selecting the full detailed hyperlink field 1720 in the web page 1700. The web page 1800 preferably includes a circuit-switched provider listing 1802 and a packet-switched telephony service provider listing 1804. The listing 1804 lists service attribute categories, including the following categories, for example: service provider 1806, pc to phone rate 1808, pc to phone monthly fee 1810, minimum prepaid amount 1812, maximum prepaid amount 1814, cancellation fee 1816, cancellation terms 1818, pc software-option #1 1820, pc software-option #2 1822, call origin restrictions 1824, call time restrictions 1826, comments about service provider 1828, and comments about rate 1830. Additional or alternative categories may also be included, as may a subset of the categories shown. A service provide service attributes portion 1832 sets forth available service attributes for each of the categories 1806 through 1830 shown. For the examples shown in the web page 1800, competitor B's service attributes are shown. For example, competitor B is shown to also offer phone cards, and uses a software package called "Software1."

Figure 19:
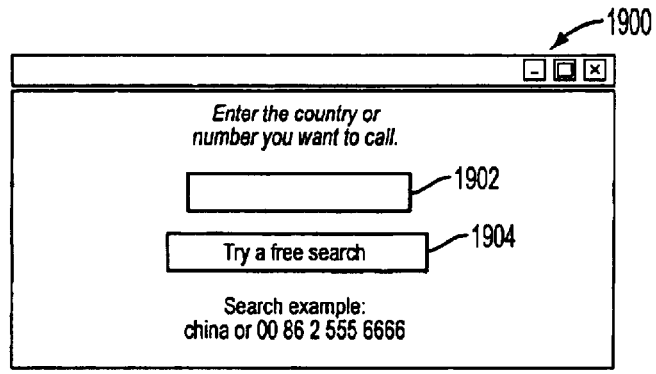
FIG. 19 is a pictorial diagram illustrating a search interface, according to a preferred embodiment of the present invention.

FIG. 19 is a pictorial diagram which illustrates a search interface 1900, according to a preferred embodiment of the present invention. The search invention 1900 may be included in a web page accessed by a user via packet-switched network at a server, for example. Such an interface may be used to obtain location-specific information. The search interface 1900 includes a query field 1902 and a transmit on-screen button 1904. A user may enter a country name (or other location description) or a telephone number in the field 1902. After entering the country or telephone number, the user may select the transmit button 1904 to cause the query to be sent across the packet-switched network to the server for use in a location-specific information search, such as a search for available telephony service providers. The server may determine whether a country name or telephone number was entered by examining the first character in the search string. If the first character is a numeral, then the server may assume that a telephone number was entered. If the first character is a letter, then the server may assume that a country name was entered.

Figure 20:
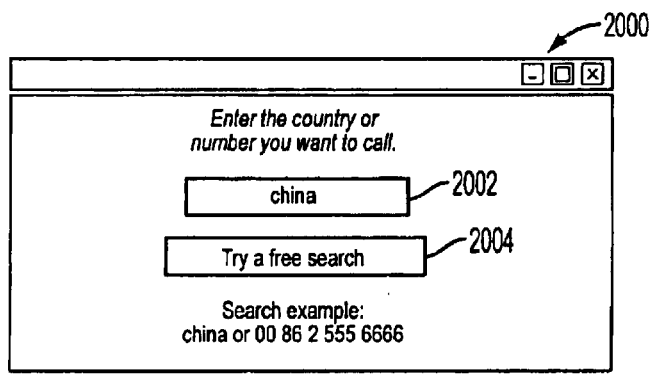
FIG. 20 is a pictorial diagram illustrating a search interface, according to an exemplary embodiment of the present invention.

FIG. 20 is a pictorial diagram illustrating a search interface 2000 according to an exemplary embodiment of the present invention. In the search interface 2000, a user has typed the word "China" in a search query field 2002. By clicking on a transmit on-screen button, the user may cause the search query string "China" to be transmitted across the packet-switched network to the server for use in a location-specific information search.

Figure 21:
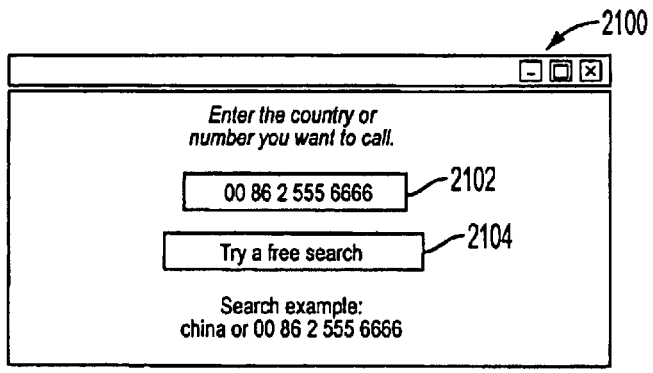
FIG. 21 is a pictorial diagram illustrating a search interface, according to an exemplary embodiment of the present invention.

FIG. 21 is a pictorial diagram illustrating a search interface 2100, according to an exemplary embodiment of the present invention. In the search interface 2100, the user has entered the telephone number "00 86 2 555 666" into a search query field 2102. By selecting a transmit on-screen button 2104, the user may cause the telephone number to be transmitted across a packet-switched network to a server for use in a location-specific information search, such as one for available packet-switched telephony service providers.

FIG. 22 is a pictorial diagram illustrating a web page 2200 for displaying a listing of available telephony service providers, according to a preferred embodiment of the present invention. The web page 2200 includes a listing of available circuit-switched providers 2200, and a listing of available packet-switched telephony service providers 2204. The listing of packet-switched telephony service providers includes service attribute categories, including one or more of the following categories: comparison 2206, call provider 2208, calling rate 2210, monthly fee 2212, initial prepay amount 2214, software download required 2216, call origin restrictions 2218, call time restrictions 2220, and full details 2222. The listing 2204 shows service attributes for packet-switched telephony service providers offering service to the telephone number "00 86 25 55 66" in "Nanjing, China." Shown are service attributes for competitor A 2224, competitor B 2226, competitor C 2228, competitor D 2230, and competitor E 2232. By reading across the rows for any of the competitors 2224–2232, a user may obtain service attributes listed in the category columns 2206–2222. For example, competitor D provides services at 36¢/minute with a $25 prepay amount. The full details category 2222 is preferably a hyperlink to a web page offering specific service attribute information for a selected service provider. The compare category 2206 allows the user to select service providers to compare service attributes for the selected service providers. In the examples shown, up to three service providers may be selected for a comparison. A "clear" on-screen button 2234 may be selected by the user to cause any selections made in the comparison category 2206 to be cleared or deleted. A "compare details" on-screen button 2236 may be selected by the user to initiate a comparison between the service providers selected in the compare category 2206.

FIG. 23 is a pictorial diagram illustrating a web page 2300 showing available service providers, according to an exemplary embodiment of the present invention. A listing of available circuit-switched providers 2302 and a listing of available packet-switched telephony service providers 2304 are shown. The listings 2302 and 2304 correspond to the listings 2202 and 2204 in FIG. 22, for the number "00 86 255 666." The listing 2304 illustrates an example in which the user has selected three competitors, competitor A, competitor B, and competitor C (listed in the call provider category 2306) by making selections in the compare category 2308. Three selection marks 2310, 2312, and 2314 illustrate the user's selections. By selecting the "compare details" on-screen button 2316, the user may transmit the selections to the server to initiate a comparison operation.

FIG. 24 is a pictorial diagram illustrating a web page 2400 for comparing available packet-switched telephony service providers, according to a preferred embodiment of the present invention. The web page 2400 includes a description category 2402, a competitor A category 2404, a competitor B category 2406, and a competitor C category 2408. The categories 2402–2408 are shown as columns in a table. The descriptions category 2402 includes a list of service attributes to be used in comparing packet-switched telephony service providers. The service attributes to be compared include pc to phone rate 2410, pc to phone monthly fee 2412, minimum prepay amount 2414, maximum prepay amount 2416, cancellation fee 2418, cancellation terms 2420, pc software-option#1 2422, call origin restrictions 2424, call time restrictions 2426, comments about service provider 2428, and comments about rate 2430. By examining the service attribute entries listed in service provider categories 2404–2408, the user may compare the service providers. For example, if the user wishes to compare rates, the web page 2400 illustrates that competitor A charges 30¢/minute, competitor B charges 33¢/minutes, and competitor C charges 36¢/minute. Modifications may be made to the web page 2400 without departing from the intended scope of the present invention. Additionally, other presentation techniques besides web pages may also be used.

Figure 25:
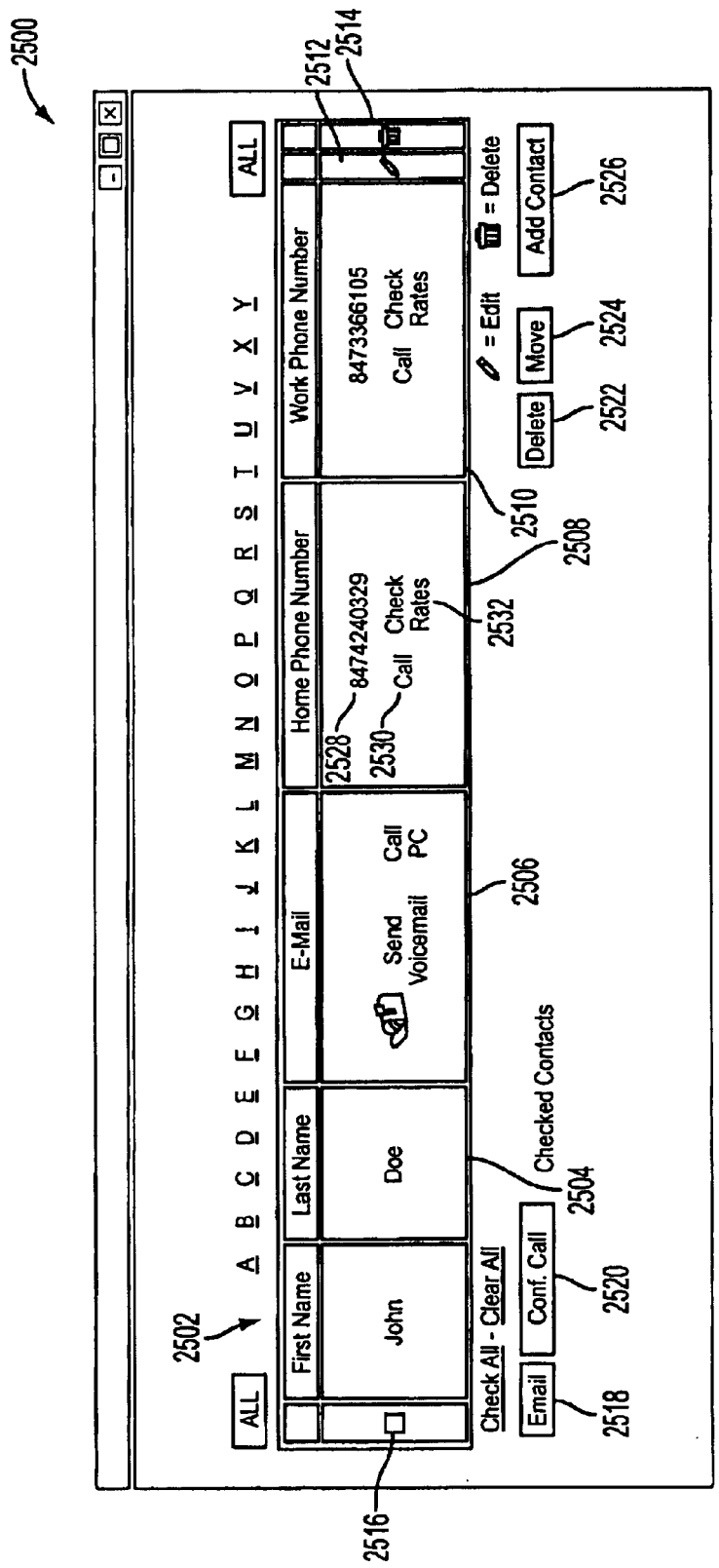
FIG. 25 is a pictorial diagram illustrating an address book interface, according to a preferred embodiment of the present invention.

FIG. 25 is a pictorial diagram illustrating an address book interface 2500, according to a preferred embodiment of the present invention. The address book interface 2500 may be displayed by an address book application located on the server to be accessed by the user across the packet-switched network, or the address book application may be located on a user device operable to transmit data across the packet-switched network to the server. The address book interface 2500 includes a first name field 2502, a last name field 2504, an e-mail field 2506, a home phone number field 2508, a work phone number field 2510, an edit on-screen button 2512, and a delete on-screen button 2514. The e-mail field 2506 is also shown to offer voice mail and pc-to-pc calling options. A flagging field 2516 is included to allow the user to check one or more address book entries to select the entries for additional operation(s). For example, on-screen buttons may be selected by the user to cause actions to be performed. An e-mail button 2518 or conference call button 2520 may be selected to send an e-mail message to entries checked in the flagging field 2516. Similarly, a conference call button 2520 may be selected to initiate a conference call between checked address book entries. Address book entries may also be operated on by selecting a delete button 2522, a move button 2524, and an add contact button 2526.

The address book interface 2500 preferably allows the user to specify a call criterion to be used by the server to initiate a call or to identify available packet-switched telephony service providers. In the example shown in FIG. 25, the address book entry for John Doe includes a home phone number 2528 of 847 424-0329. A call option 2530 may be selected to initiate a packet-switched telephony call to the telephone number 2528. A check rates option 2532 may be selected to identify available packet-switched telephony service providers, which may be used to selected to select a preferred service provider for use in making a call. If the address book application is located at the user device, selection of the call option 2530 or the check rates option 2532 causes a call criterion, such as the telephone number 2528, to be transmitted across the packet-switched network to the server for use in a process for initiating a call or a process for determining available service providers. If the call application is located at the server, then selection of the call option 2530 or the check rates options 2532 may cause the call criterion to be used in a call initiation process or a process for determining available service providers.

In view of the wide variety of embodiments to which the principles of the invention can be applied, it should be understood that the illustrated embodiments are exemplary only, and should not be taken as limiting the scope of the present invention. For example, more or fewer elements or components may be used in the block diagrams. In addition, the present invention can be practiced with hardware or a combination of software and hardware.

We claim:

1. A server for presenting available packet-switched telephony service providers offering packet-switched telephony service to a geographic location, comprising in combination:

a network interface, the network interface linking the server to a packet-switched network, wherein the packet-switched network is the Internet;

a packet-switched telephony service provider database including service attributes associated with packet-switched telephony service providers, wherein the packet-switched telephony service provider is an ITSP database, and wherein the service attributes include geographic location information;

a telephone code database including geographic location information associated with telephone number portions;

a processor running an operating system and operable to execute a user access application and a database access application, wherein the user access application includes an HTTP daemon, an ASP module, and a home page, wherein the database access application includes application scripts, a telephone number request handler, and a SQL processor, and wherein the database access application enables the processor to access the telephone code database to determine a geographic location associated with a telephone number portion and to access the packet-switched telephony service provider database to determine the packet-switched telephony service providers offering telephony service to the geographic location, thereby enabling a user to select a packet-switched telephony service provider offering packet-switched telephony service to the geographic location.

* * * * *

UNITED STATES PATENT AND TRADEMARK OFFICE
CERTIFICATE OF CORRECTION

PATENT NO.        : 6,853,621 B1
APPLICATION NO.   : 09/487410
DATED             : February 8, 2005
INVENTOR(S)       : Laurance A. Spear and John A. Nix Page 1 of 1

It is certified that error appears in the above-identified patent and that said Letters Patent is hereby corrected as shown below:

In the claims:

In column 26, line 53, "packet-switched telephony service provider" should read --packet-switched telephony service provider database--.

Signed and Sealed this
Nineteenth Day of February, 2013

Teresa Stanek Rea
*Acting Director of the United States Patent and Trademark Office*